(12) United States Patent
Shiyafetdinov et al.

(10) Patent No.: US 8,024,450 B1
(45) Date of Patent: *Sep. 20, 2011

(54) SYSTEM AND METHOD FOR REMOTE ADMINISTRATION OF COMPUTER NETWORK

(75) Inventors: Damir R. Shiyafetdinov, Moscow (RU); Andrey A. Kulaga, Moscow (RU); Sergey A. Vasilyev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,609

(22) Filed: Apr. 27, 2011

Related U.S. Application Data

(63) Continuation of application No. 13/095,049, filed on Apr. 27, 2011.

(30) Foreign Application Priority Data

Dec. 30, 2010 (RU) ................................ 2010154526

(51) Int. Cl.
*G06F 15/173* (2006.01)
*G06F 15/16* (2006.01)
*H04L 12/28* (2006.01)

(52) U.S. Cl. .......................... 709/223; 709/227; 370/401
(58) Field of Classification Search .................. 709/223, 709/227; 370/401
See application file for complete search history.

(56) References Cited

U.S. PATENT DOCUMENTS

| 5,655,081 | A | 8/1997 | Bonnell et al. |
| 5,933,647 | A | 8/1999 | Aronberg et al. |
| 6,529,784 | B1 | 3/2003 | Cantos et al. |
| 6,871,223 | B2 | 3/2005 | Drees |
| 7,603,452 | B1 | 10/2009 | Guo |
| 7,627,902 | B1 | 12/2009 | Rive et al. |
| 7,735,130 | B2 | 6/2010 | Sato et al. |
| 7,917,954 | B1 | 3/2011 | Zaitsev |
| 2008/0215668 | A1 | 9/2008 | Hu |
| 2009/0037594 | A1 | 2/2009 | Sever et al. |
| 2009/0293100 | A1 | 11/2009 | Kang et al. |
| 2010/0027552 | A1 | 2/2010 | Hill |
| 2010/0169392 | A1 | 7/2010 | Lev Ran et al. |

FOREIGN PATENT DOCUMENTS

| GB | 2365556 A | 2/2002 |
| WO | 9613113 A1 | 5/1996 |

*Primary Examiner* — Ranodhi Serrao
(74) *Attorney, Agent, or Firm* — Arent Fox LLP; Michael Fainberg

(57) ABSTRACT

Disclosed are systems, methods and computer program products for remote administration of a computer network. The system comprises an administration server for remotely managing a computer network. The server deploys administration agents on the computers in the network for performing various administrative tasks. In addition, the server selects a computer with the highest performance rating as a local administration proxy for the network. The server then transmits to the local administration proxy a control signal for performing one or more administrative tasks by administration agents deployed on the computers in the network. The server then establishes, through the local administration proxy, a connection with the administration agents for performing administrative tasks of the computers.

20 Claims, 14 Drawing Sheets

SYSTEM AND METHOD FOR REMOTE ADMINISTRATION OF COMPUTER NETWORK

CROSS-REFERENCE TO RELATED APPLICATIONS

This application is a continuation of U.S. application Ser. No. 13/095,049 filed on Apr. 27, 2011, which claims benefit of priority under 35 U.S.C. 119(a)-(d) to Russian Application No. 2010154526 filed on Dec. 30, 2010, which is incorporated by reference herein.

TECHNICAL FIELD

This present disclosure relates generally to the field of remote control technologies and, more specifically, to systems, methods and computer program products for remote administration of a computer network.

BACKGROUND

Personal computers (PCs) have become essential part of any business enterprise. It is impossible to imagine a modern office, regardless of its size, without a PC for every employee. The corporate PCs are typically connected in a computer network, which enables secure communication and file exchange between PC users. However, administration of a large corporate network, having hundreds and often thousands of disparate PCs and other networked devices, such as printer, scanners, facsimile machines, mobile communication devices used by employees, is a complicated task. The failures in network management may result in network security breaches, computer malfunctions, and other problems that can negatively affect productivity of the employees and cost thousands of dollars in lost profits and repair costs.

Therefore, the development of problem-solving approaches, similar to the application of remotely installed or cloud-based software, has been recently developed. Such approach, for example, is the "software as a service" (SaaS) approach. Saas is a software sale business model where the supplier develops a web application and administers it independently, providing the customer online access to the software. Thus, all interaction is realized online between the service supplier's server, where the software is installed, and the corporate networked PC. In this and other situation of remote administration of network computers, certain difficulties may occur, since not every networked PC can be connected to the Internet or such PC's may be located in a closed network not accessible to the service supplier's server. Accordingly, there is a need to improve techniques for remote administration of a computer network.

SUMMARY

Disclosed are systems, methods and computer program products for remote administration of a computer network. In one example embodiment, the system comprises a plurality of administration agents deployed on the computers in the network. The administration agent being configured to: collect configuration information from a computer on which it is deployed; transmit the collected configuration information to a remote administration server for computing performance ratings of the computers based on the configuration information and selecting a local administration proxy for the network based on the performance rating; and perform on the computer one or more administrative tasks specified by the remote administration server through a connection with the remote administration server.

The system further includes a local administration proxy for the network. The local administration proxy includes a computer with the highest performance rating in the computer network selected by the remote administration server based on the configuration information collected by the administration agents. The local administration proxy being configured to: receive from the remote administration server a control signal addressed to a computer in the network for performing one or more administrative tasks on said computer; and in response to the control signal, establish, through the local administration proxy, the connection between the remote administration server and the administration agent deployed on said computer for the performing administrative tasks on said computer.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects of the invention may be employed, and this description is intended to include all such aspects of the invention and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for remote administration of a computer network. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1A:
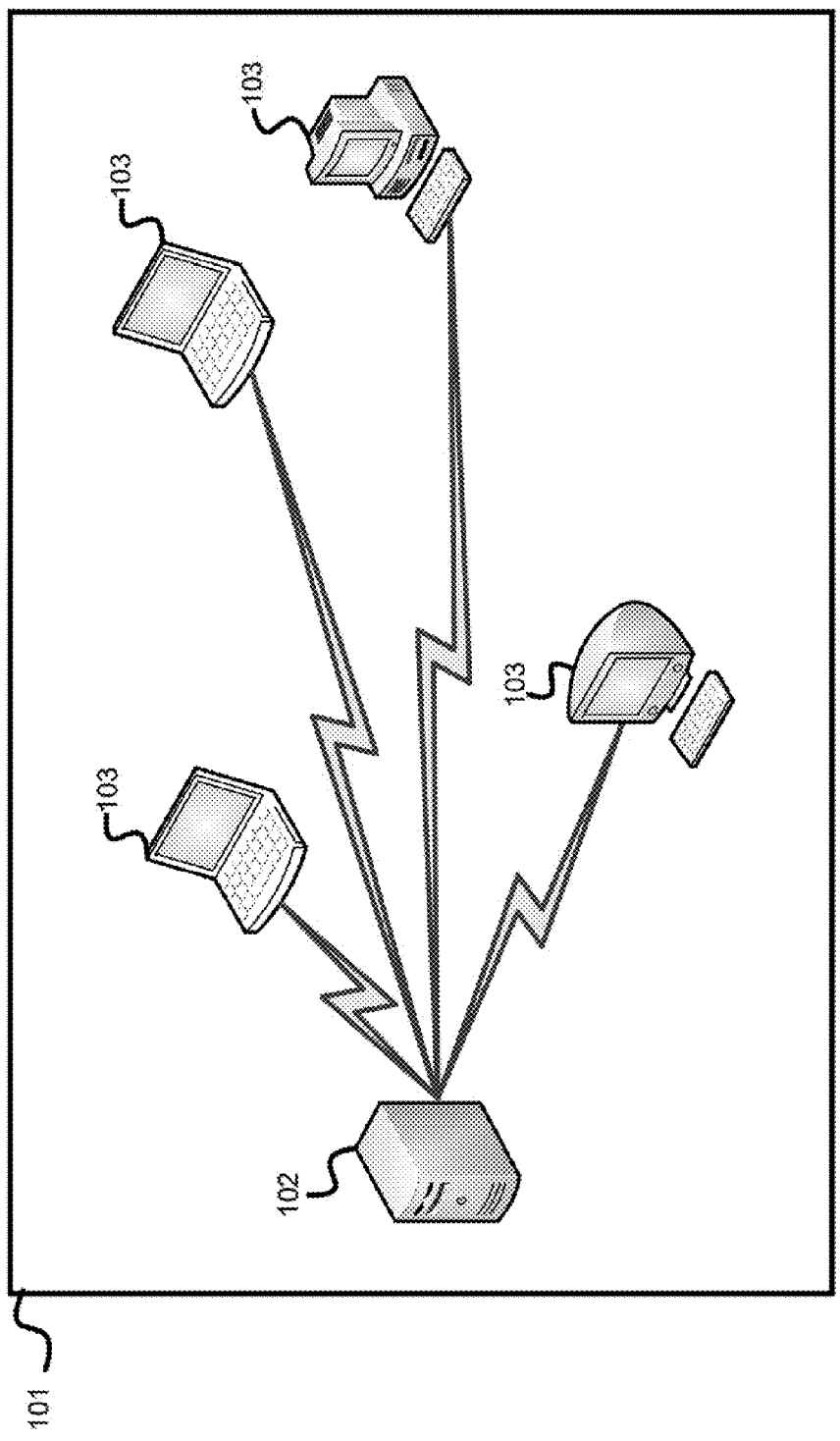
FIG. 1A illustrates a schematic diagram of a system for remote administration of networked personal computers in the case of direct communication of the administration server and the controlled PCs in accordance with one example embodiment.

FIG. 1A illustrates a remote administration system for networked computers in the case of direct communication of administration server 102 and controlled PC 103 in accordance with one example embodiment. As depicted, network 101 that can be, for example, a corporate network, may consist of multiple PCs 103. Remote administration tasks of any networked PC 103 by administration server 102 may be solved via direct connection of PC 103 of the network 101 to administration server 102. Therefore, administration server 102 is also located in the network 101. Each PC 103 has an administration agent installed thereon to which the administration server 102 sends control signals, as required, and which communicates to administration server 102, as needed. The remote administration tasks are wide range of activities provided by the administration server 102 to the PCs 103. These activities include, but are not limited to:

updating anti-virus databases and software modules on PC 103;

managing policies and group tasks of any PC 103;

remote installation of applications and patches on any PC 103;

searching for vulnerabilities in any PC 103;

software and hardware inventory of any PC 103; and storing any information on the administration server 102. The above list of tasks is a sample list and it does not limit the capabilities of administration server 102.

However, in some cases, the illustrated remote administration architecture may not be effective in the sense of network interaction between administration server 102 and PC 103, with the administration agent installed thereon. For example, such cases can be the situations when PCs 103 are located in a network 101 which is DMZ (demilitarized zone) or other type of closed network. DMZ is the technology providing protection of the information perimeter where PCs 103 are in a special network segment (that is called DMZ) and have restricted access to other network segments by means of inter-network firewall. Therefore, the connection from the PC 103 in the network 101, that is DMZ or closed network, to the network segment, where the administration server 102 is installed, is not possible.

Figure 1B:
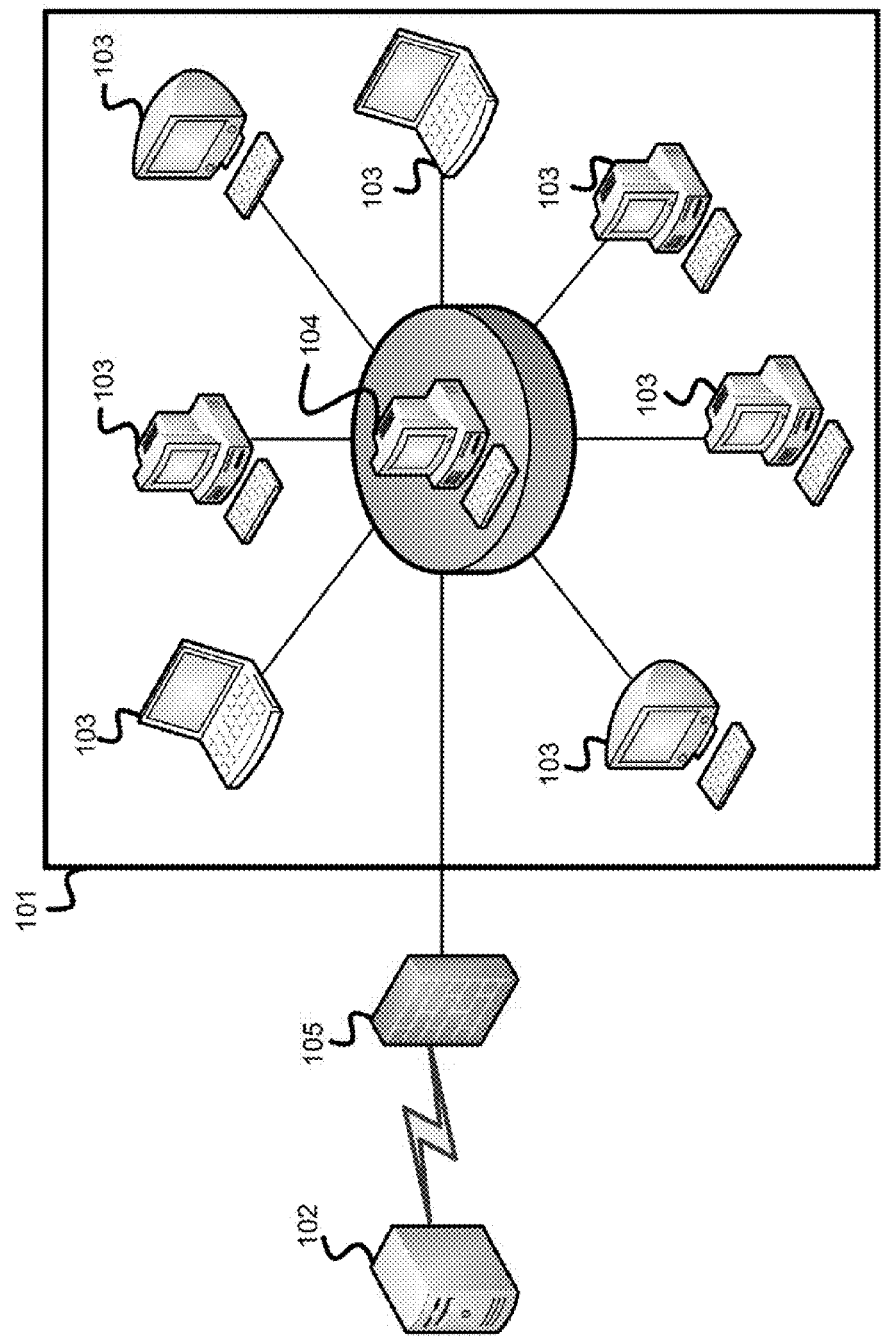
FIG. 1B illustrates a schematic diagram of a remote administration system of networked personal computers in the case of a DMZ network in accordance with one example embodiment.

FIG. 1B illustrates a remote administration system of networked personal computers in case of DMZ (or other closed) network 101 in accordance with one example embodiment. DMZ network 101 consists of multiple PCs 103 with administration agents deployed thereon; the connections of PCs 103 of the DMZ network 101 to the network segment of administration server 102 are blocked by firewall 105.

To avoid the communication problem of the PCs 103 of DMZ network 101 with administration server 102, located in the network segment different from of DMZ network 101, the administration server 102 selects one PC 104 from the set of PCs 103 with installed administration agents in accordance with one embodiment. Further, that PC 103 is assigned as a local administration proxy 104 for the administration server 102 for the network 101. Then, any PC 103 with installed administration agent establishes connection to administration server 102 via an administration proxy 104. The connection between administration proxy 104 and any PC 103 of the DMZ network 101 is established between their administration agents.

Figure 1C:
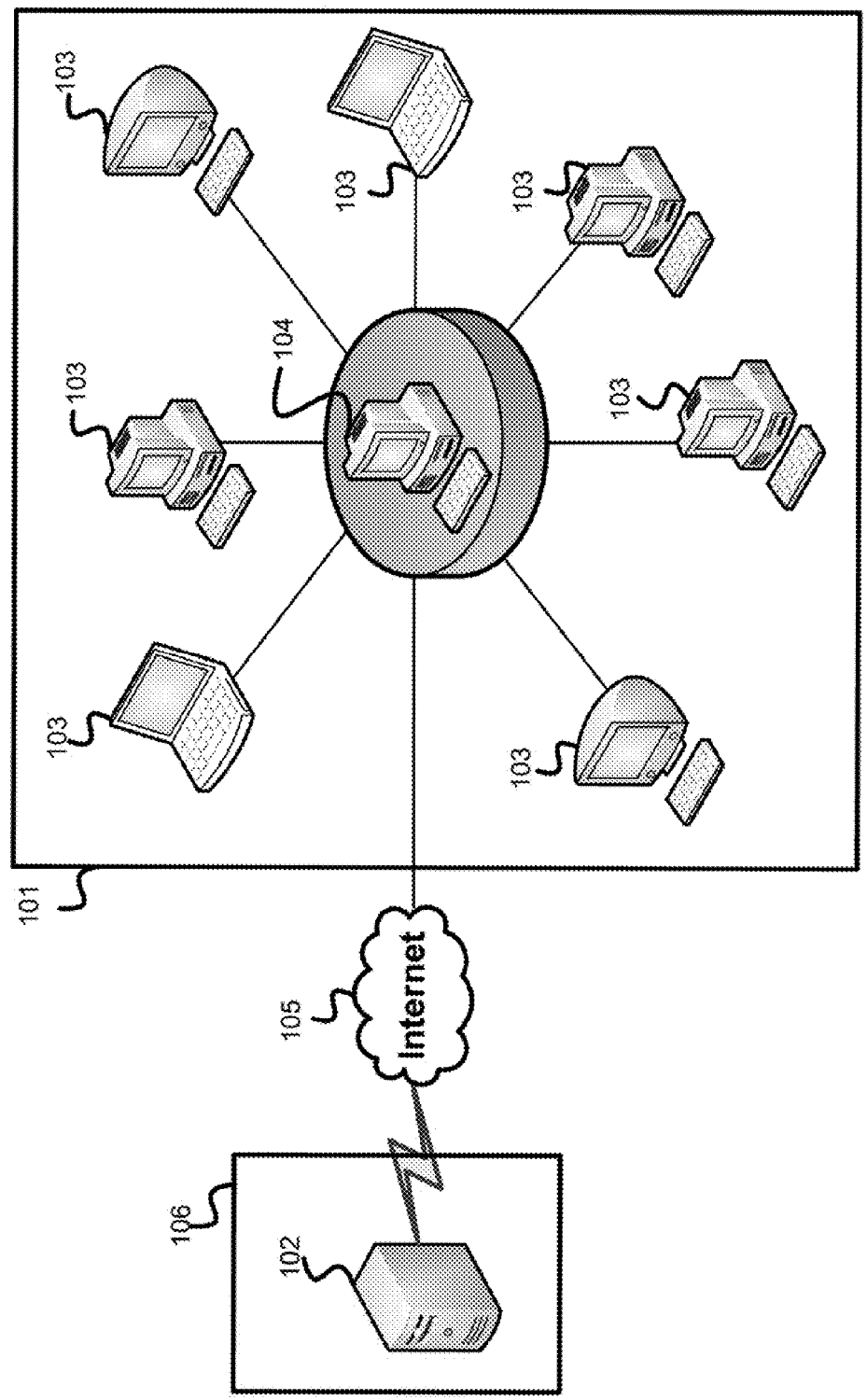
FIG. 1C illustrates a schematic diagram of a system for remote administration of networked personal computers in the case when PCs are in a separate computer network that differs from the administration server's network in accordance with one example embodiment.

The other case of ineffective network interaction between administration server 102 and the PC 103 with installed administration agent is when the PC 103 is located in a separate network 101 that is different from the network 106 of administration server 102. FIG. 1C shows the flowchart of a remote administration system for personal computers within the network 101 where PCs 103 are located in the separate network 101 that is different from the network 106 of administration server 102. Here the communication between the PC 103 of the network 101 with installed administration agent and the administration server 102, located in the different network 106, is realized via the Internet 105. However, in this network configuration, some of the PCs 103 in the network 101 have no access to Internet 105. To perform remote administration tasks on the PCs 103 in the network 101 (even on the PCs 103 that have no Internet access 105) the administration server 102 located in the other network 106 selects for communication an administration proxy 104 in the network 101. The communication with administration server 102 is effected through the administration agent installed on administration proxy 104. Then any PC 103 with installed administration agent in the network 101, different from the network 106 of administration server 102, establishes a connection to administration server 102 via an administration proxy 104. The connection between administration proxy 104 and any PC 103 in the network 101, different from the network 106 of administration server 102, is established between their administration agents.

The connection between administration server 102, administration proxy 104 and any PC 103 in the network 101 with installed administration agent is realized by means of network protocols that are currently in use. These can be, for instance, the UDP and TCP protocols.

Figure 2A:
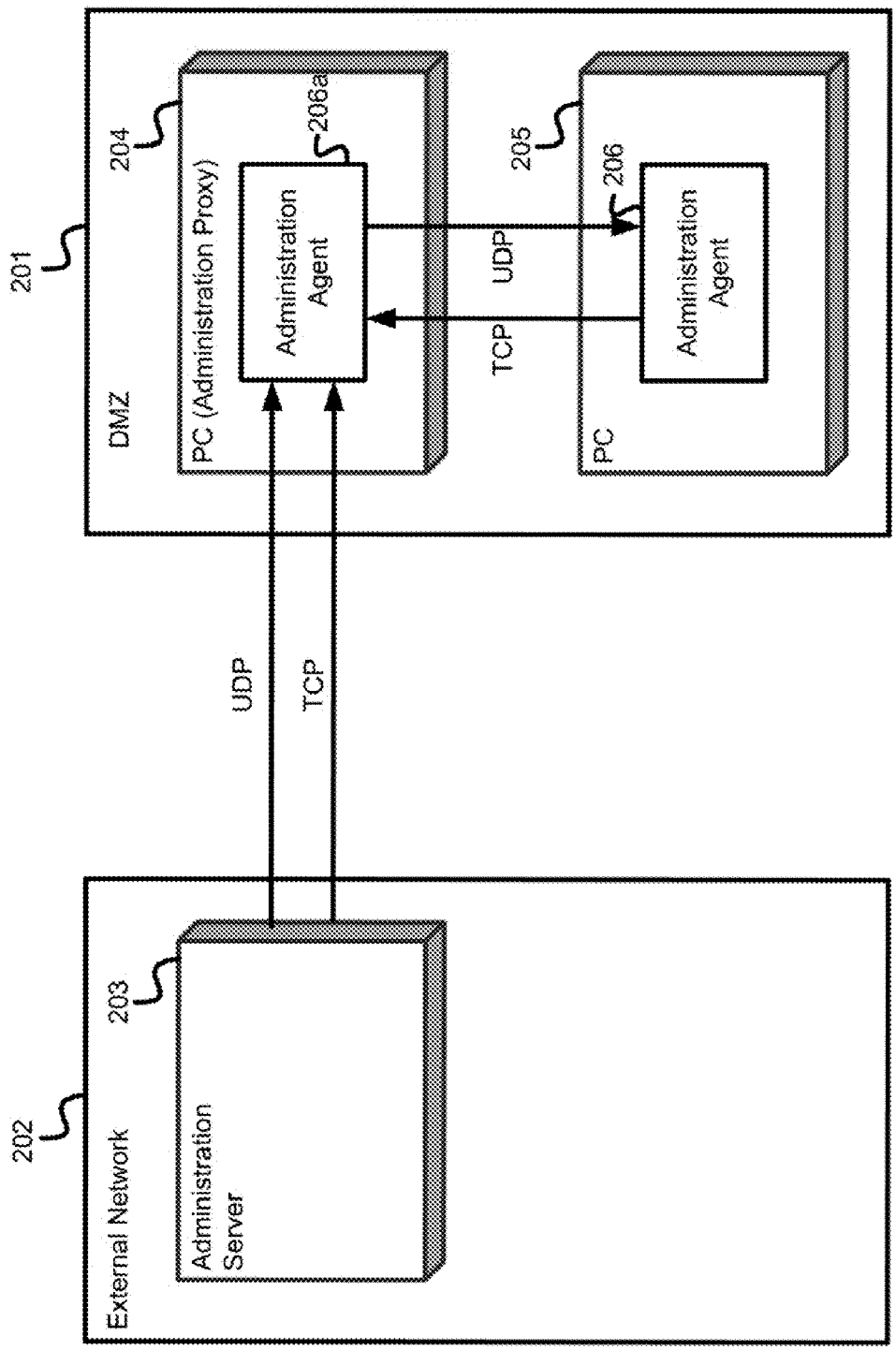
FIG. 2A illustrates the mechanism of interaction between the administration server and a DMZ-networked PC through an administration proxy via UDP and TCP protocols in accordance with one example embodiment.

FIG. 2A shows the mechanism of interaction between administration server 203 (the same as 102) with the PC 205 (the same as 103), located within the network 201 (the same as 101), that is DMZ, via an administration proxy 204 (the same as 104) by means of UDP and TCP protocols. Each PC 205 in the DMZ network 201 has administration agents 206 installed thereon. The administration proxy 204 has administration agent 206a installed as well. The administration agent 206a installed in the administration proxy 204 is the same as the ones 206 installed in the PCs 205 within the DMZ network 201. These agents perform a number of tasks, for example, they may be used to connect PC 205 in the DMZ network 201 via an administration proxy 204 to administration server 203 located in an internal network 202 that is different from the DMZ network 201. The administration server 203 establishes a TCP connection to administration agent 206a of administration proxy 204. Furthermore, the administration server 203 directs a UDP control signal to administration agent 206a of administration proxy 204 to perform some remote administration task. Furthermore, administration agent 206a installed on the administration proxy 204 is able to retransmit a UDP control signal from administration server 203 to any administration agent 206 installed in any PC 205 in the DMZ network 201. In the response to the UDP control signal, an administration agent 206 of any PC 205 establishes a TCP connection to administration agent 206a of administration proxy 204, and performs the remote administration task required. Thus, the administration agent 206 of every PC 205 in the DMZ network 201 can establish a TCP connection to administration server 203 via administration agent 206a of administration proxy 204; it can transmit data to administration server 203 and receive them, respectively.

Figure 2B:
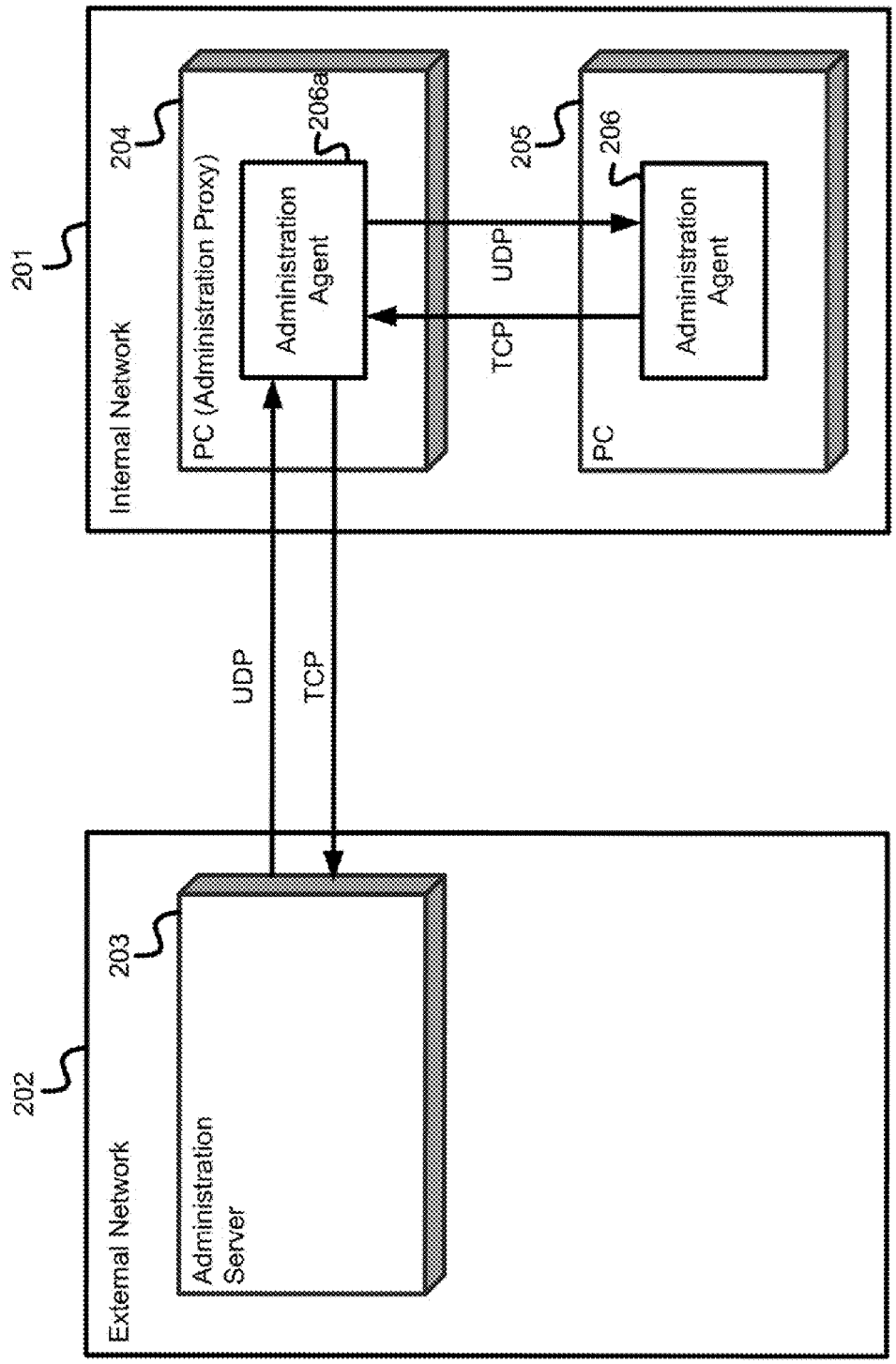
FIG. 2B illustrates the mechanism of interaction through an administration proxy via UDP and TCP protocols between the administration server and a networked PC in a network that is different from the network of the administration server in accordance with one example embodiment.

FIG. 2B shows a mechanism of interaction between administration server 203 and PC 205 located in the network 201 that differs from the external network 202, where administration server 203 is located, via an administration proxy 204 by means of UDP and TCP protocols. To force establishing a connection to administration agent 206a installed in administration proxy 204, administration server 203 transmits a UDP control signal to administration agent 206a to perform a remote administration task. After receiving a UDP control signal, the administration agent 206a of administration proxy 204 establishes a connection to administration server 203 by means of a TCP protocol. Then, the administration agent 206a installed on the administration proxy 204 is able to retransmit UDP control queries from administration server 203 to any administration agent 206 installed at any PC 205 in the network 201. In response to the UDP control query from administration server 203, the administration agent 206 of any PC 205 establishes a TCP connection to administration agent 206a of administration proxy 204 and performs the required remote administration task. Thus, administration agent 206 of every PC 205 in the network 201 can be connected to administration server 203 located in the external network 202, different from the network 201, via administration agent 206a of administration proxy 204 by means of TCP protocol, as well as to transmit data to administration server 203 and receive data, respectively.

Figure 3A:
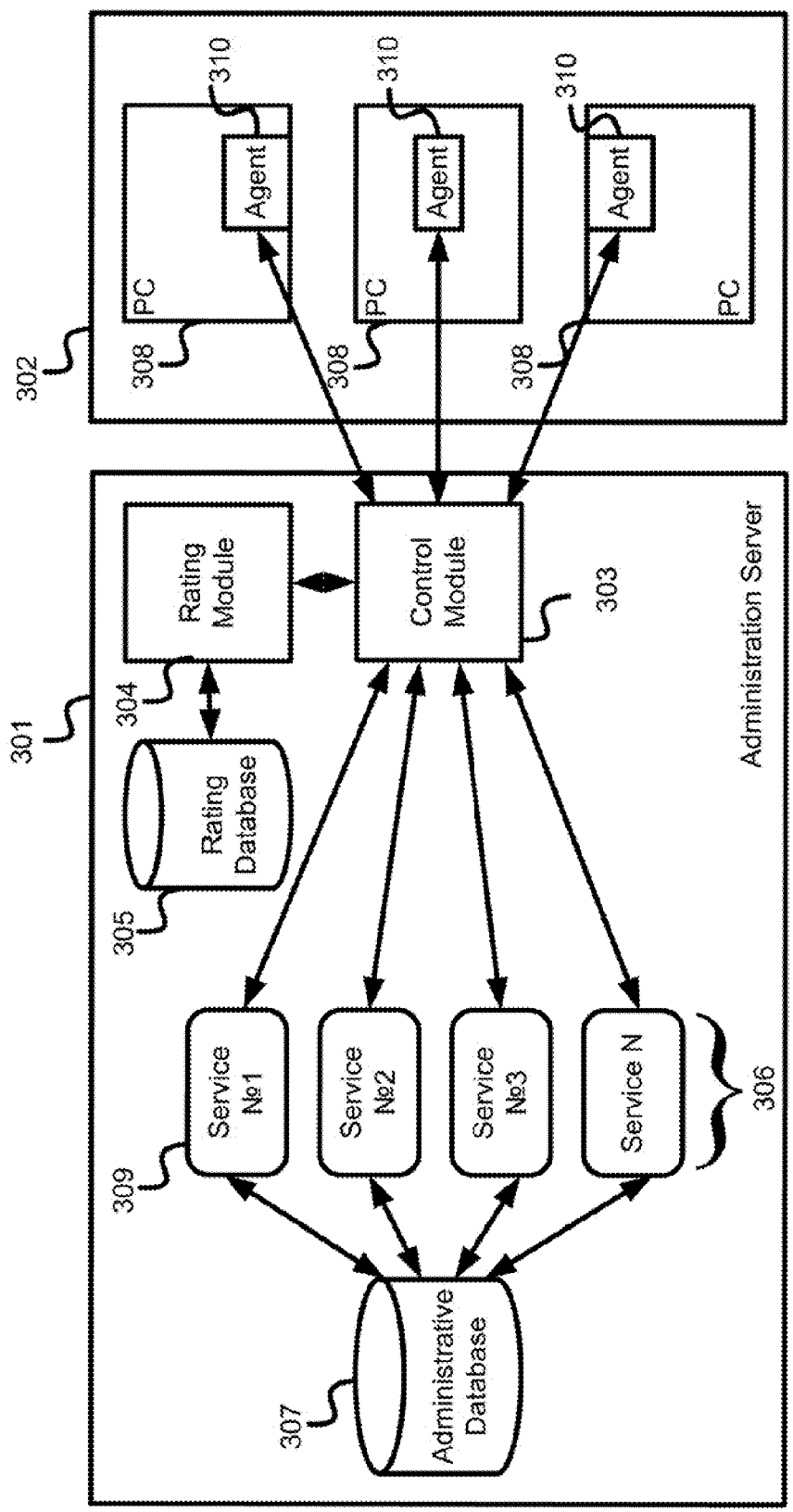
FIG. 3A illustrates the detailed interaction between the administration server and all networked PCs in a network that is different from the network of the administration server in accordance with one example embodiment.

FIG. 3A shows detail interaction between administration server 301 (the same as 102 and 203) and all PCs 308 (the same as 103 and 205) within the network 302 (the same as 101 and 201) in accordance with one example embodiment. The network 302 here is a computer network that differs from the computer network of administration server 301. Every PC 308 in the network 302 is unique; every PC 308 has its unique firmware configuration. The PC 308 may be either a netbook that is not intended for performing complex calculations, or a high-performance personal computer. Any of PCs 308 in the network 302 may have various applications installed thereon, including resource-intensive ones. Because of the variations in firmware configurations, the performance of the PC 308 located in the network 302 is different. In addition, tasks to establish connection between administration server 301 and any of the PCs 308 via the administration proxy as well as tasks for information transmission from any of the PCs 308 via the administration proxy to administration server 301 have impact on the administration proxy performance. Thus for the most effective solution of the connection and data transmission tasks from one of the PCs 308 in the network 302 to administration server 301, the administration proxy should have high performance. As it was stated above, to communicate to the remote PCs 308 located in the network 302 that is different from the network of administration server 301, the administration server 301 selects from the number of the PCs 308 the one that will be assigned as the administration proxy for the network 302. Furthermore, the administration proxy will be used for communication between any PC 308 in the network 302 and administration server 301. The mechanism for selection of an administration proxy from the number of PCs 308 in the network 302 is described below.

In one example embodiment, the administration server 301 includes a number of services 306, an administrative database 307, a rating database 305, a rating module 304 and control module 303. Some services 306 are used for remote administration of network 302. Such services can include, but are not limited to, updates and patch distribution services for PCs 308, troubleshooting services, and firmware configuration data inventory services for every PC 308 in the network 302, as well as other services for performing various administrative tasks. An administrative database 307 contains updates for various applications, patches, lists of known vulnerabilities, and firmware configuration data for each PC 308 in the network 302, and other information used by the services 306 to generate administrative tasks.

Every PC 308 in the network 302 has an administration agent 310 (the same as 206) installed thereon; it is required to perform remote administration tasks and provide communication between PC 308 in the network 302 and administration server 301. In addition, every PC 308 in the network 302 has its unique network address. At the initial stage, a control module 303 is intended to provide a direct connection between administration server 301 and all of the PCs 308 in the network 302 in the case where the network 302 is different from the network of administration server 301. When the PC 308 in the network 302 is selected as the most appropriate one to function as an administration proxy, the control module 303 is assigned to provide direct communication with administration proxy as well as communication by means of the administration proxy with all PCs 308 in the network 302. In addition, service data from the number of services 306 are transmitted via control module 303. The administration server 301 is a computer that is able to provide computer security and administration services. These functions can be realized by means of corporate software products such as Kaspersky® Security for Microsoft® Exchange Server, Kaspersky® Anti-Virus for Windows® Servers, Kaspersky® Anti-Virus for Windows® Workstations and some other products which could be managed by means of control module 303 that could be the Kaspersky® Administration Kit.

At the initial stage, the administration server 301, namely its control module, in particular 303, communicates directly to all PCs 308 in the network 302. In the case when the network 302 is different from the network of administration server 301, the administration agents 310 of all PCs 308 in the network 302 that have Internet access are able to establish a TCP connection to administration server 301 and, in particular, to the control module 303 upon receiving a UDP control signal from control module 303. Among the services 306 installed on the administration server 301, there is inventory service 309 (i.e. firmware configuration data collection service) of any PC 308. Such a service is required for interaction with administration agent 310 of any PC 308 to launch inventory tasks remotely. At the initial stage, the inventory task for all PCs 308 in the network 302 will be set by means of service 309 from the number of installed services 306. Upon receiving the task information from the service 309 from the number of installed services 306, the control module 303 transmits a UDP control signal to the administration agents 310 of all PCs 308 in the network 302 to perform collection of configuration information. In the case, where the network 302 is different from the network of administration server 301, the administration agents 310 of each PC 308, upon receiving a UDP control signal from control module 303, establish a TCP connection to administration server 301 and, particularly, to its control module 303. Then, the administration agents 310 of each PC 308 in the network 302 collect configuration information about the PC 308 on which they are deployed. The collected configuration information can include, but is not limited to:

- information about the type and main hardware parameters of the PC 308, such as CPU type, CPU clock, RAM memory space, etc.;
- software configuration data, namely: what type and version of software is installed on the PC 308; what software is launched automatically; continuously operating software agents in the PC 308;
- network address of PC 308;
- number of hours of continuous operation of PC 308; and CPU usage data of the PC 308 after boot-up.

The above-mentioned dataset (i.e., configuration information) is a sample and it does not limit the capabilities of the administration agents 310 deployed on other PCs 308 in the network 302. The data collected from each PC 308 in the network 302 has an identifier that makes them unique. Such an identifier, for example, can be a network address that is individual for each PC 308. When the administration agents 310 of each PC 308 in the network 302 have the data collected, an administration agent 310 of every particular PC 308 transmits the collected data to control module 303. In turn, a control module 303 transmits data to the rating module 304. The rating module 304 serves to select the PC 308 from the number of PCs 308 in the network 302 which is the most appropriate as an administration proxy for network 302. For this purpose, the rating module 304 compares the obtained data with information from rating database 305. The rating database 305 contains rules of performance rating evaluation of each PC 308 in the network 302. The given rules can be based on number of variables, such as:

- CPU type;
- CPU clock;
- video RAM capacity;
- video card type;
- RAM memory space;
- continuous operation hours of PC 308;
- load on PC 308 after PC 308 boot-up.

The above-mentioned number of variables is a sample and does not limit the capabilities of the described system. Every rule determines the performance rating for each particular variable. The given rules are required for evaluation of the total performance rating of each PC 308 in the network 302.

Figure 4:
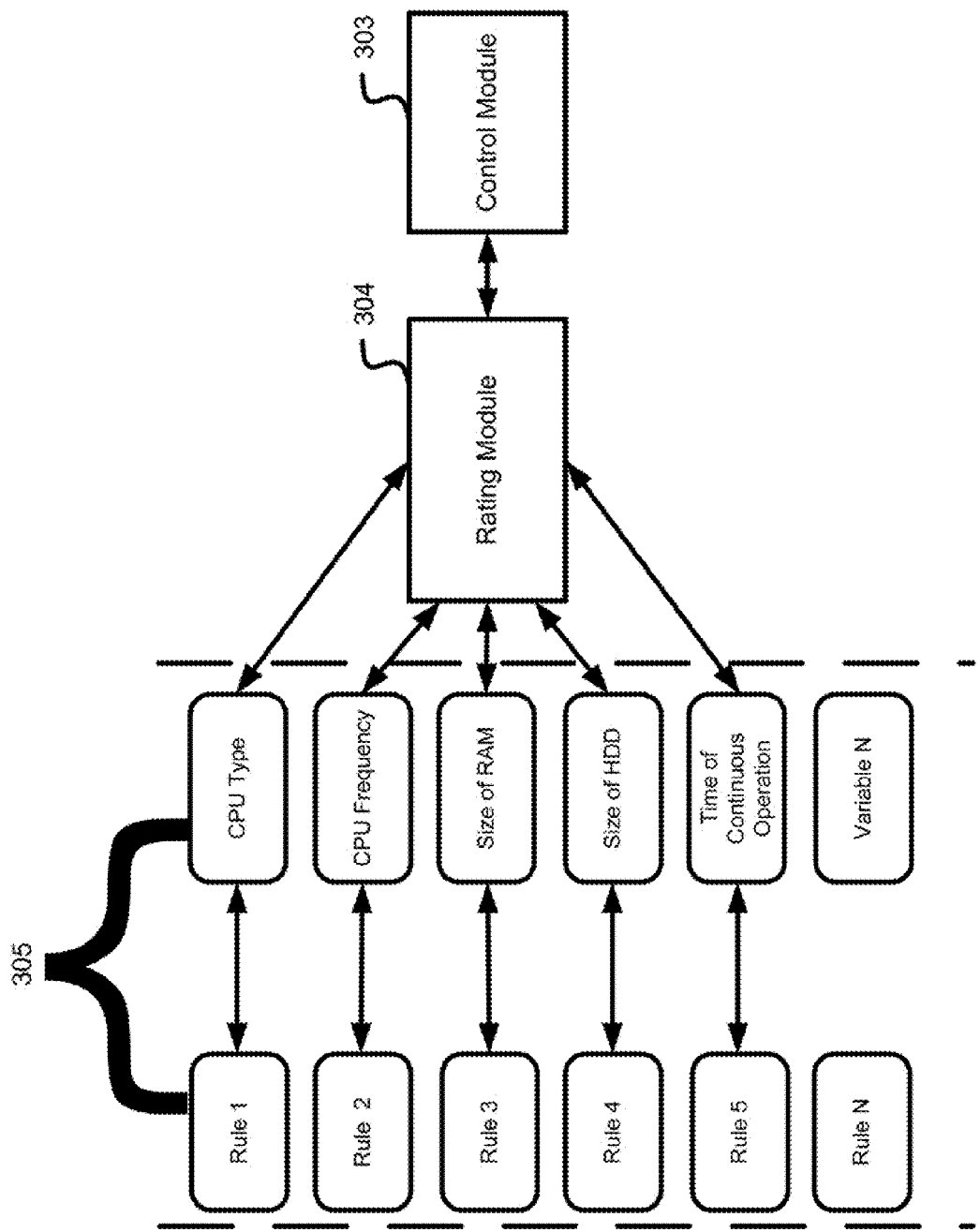
FIG. 4 illustrates an example of interaction between control modules, rating modules and rating database for determining the total performance rating of the PC in accordance with one example embodiment.

FIG. 4 illustrates the example of interaction between control module 303, rating module 304 and rating database 305 for determination of total performance rating of each PC 308 in the network 302. Let in the example the network 302 consist of three PCs 308. Here, the network 302 is different from the network of administration server 301. One of the PCs 308 has no Internet access meaning that it will not respond to UDP control signals from administration server 301 and will not be able to establish a TCP connection therewith. Thus, in the given example, the first PC 308 in the network 302 cannot be an administration proxy since it does not have Internet connection. All three PCs 308 have different firmware configurations. Example: the first PC 308 is Asus Eee® PC 1005P net book. Its hardware configuration includes such elements as CPU Intel® Atom 1660 MHz; RAM 2048 MB, video card Intel® GMA 3150 with video RAM capacity of 64 MB and possibility to RAM resources for particular needs. This PC 308 has no Internet connection. The hardware configuration of the second PC 308 includes such elements as CPU Intel® Core 2 i3-530 2930 MHz, RAM 4096 MB, video card Asus® ENGTX285/2D1/1GD3 with video RAM capacity of 1024 MB. The third PC 308 is a laptop computer with the following hardware configuration: CPU Intel® Celeron® Dual Core 1200 MHz, RAM 2048 MB, nVidia® GeForce® G 210M with video RAM capacity of 512 MB. As stated above, upon reception of a UDP control signal from the control module 303, administration agents 310 in the PC 308 establishes a TCP connection with the control module 303 and collects configuration information. The second and third PCs 308 have Internet connection; therefore, it is possible to perform the actions described above on these PCs 308 in the network 302. The collected information may include information about the main hardware elements listed above. In addition, such information can include information about the continuous operation hours of the particular PC 308. Each PC 308 has different continuous operation hours, for instance, the first PC 308 works during continuously for 10 hours, the second PC 308 works continuously during 30 hours, and the third PC 308 works continuously during 20 hours. Then, the configuration information from administration agents 310 of the three PCs 308 in the network 302 are transmitted via control module 303 to rating module 304. The collected configuration information for each PC 308 have an identifier allowing defining the PC 308 to which that data belong. Such an identifier here is a network address that is unique for each PC 308. The rating module 304 compares the collected configuration information to the rating information in the rating database 305 and selects appropriate rating rules for each variable. In one example embodiment, the primary variables for selecting rating rules used to the total performance-rating evaluation are CPU clock, RAM, video RAM capacity and continuous operation hours. The rating rules for all variables may be based on both crisp and fuzzy logics.

Figure 5:
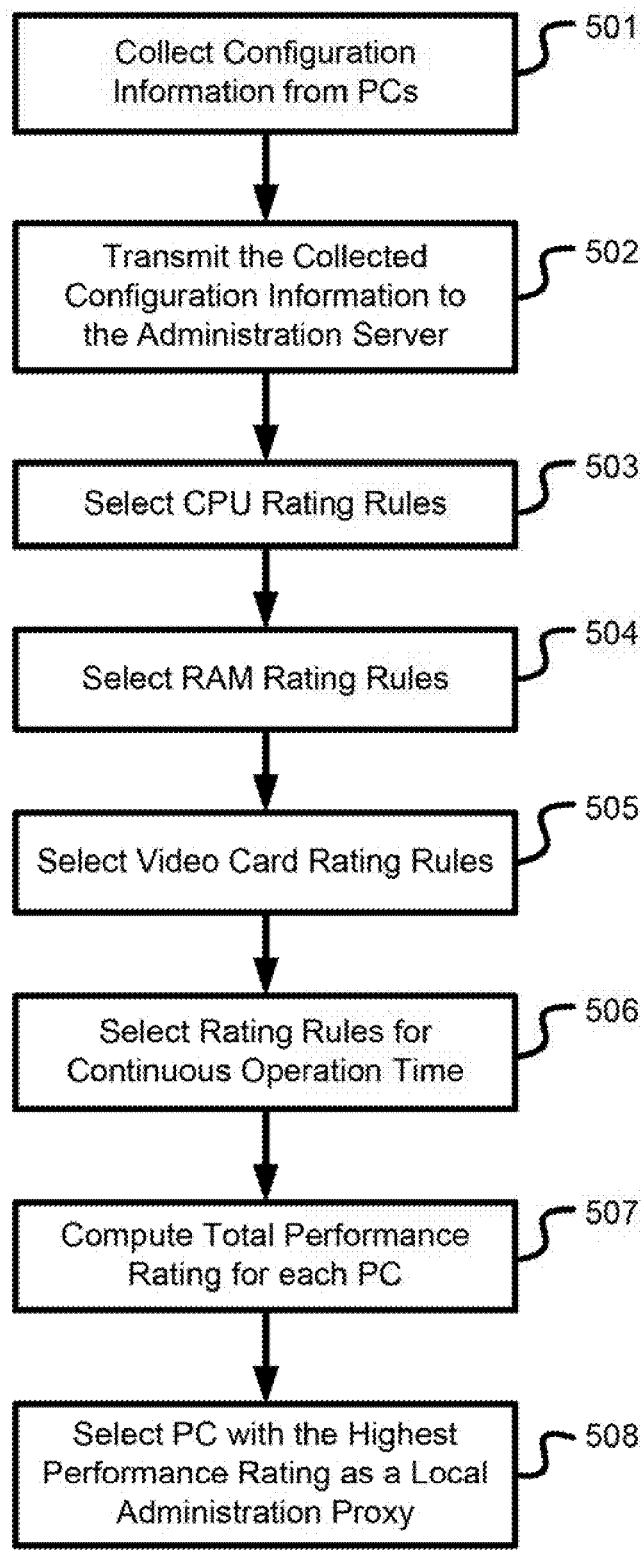
FIG. 5 illustrates an algorithm for evaluation of each PC's total performance rating based on crisp logic to select the most relevant PC to be set as an administration proxy in accordance with one example embodiment.

FIG. 5 illustrates an example model for implementation of the algorithm for determining the total performance rating for each PC 308 in the network 302; the algorithm is based on crisp (i.e., non-fuzzy) logic and serves to select a PC 308 that is most suitable to be assigned as an administration proxy for the network 302. At step 501, the administration agents 310 of all PCs 308 collect configuration information from all PCs 308. Then, at step 502, the configuration information from administration agents 310 of all PCs 308 in the network 302 are transmitted via control module 303 to the rating module 304; the latter compares them with the information in the rating database 305. The next stages describe the decision-making logic based on the rating rules from rating database 305. At steps 503-506, appropriate rules will be selected for each variable from rating database 305. Thus, for the example, at step 503, the CPU rating rule will be selected for the second PC 308 and for the third PC 308. Each CPU rating rule determines a performance rating for the CPU. The CPU of the second PC 308, Intel® Core 2 i3-530 2930 MHz, is of higher power compared to CPU Intel® Celeron Dual Core 1200 MHz of the third PC 308. For instance, the rule for the second PC 308 may be as follows: "If the CPU is Intel® Core 2 i3-530 2930 MHz, then its rating is 3000". The rule for the third PC 308 may be as follows: "If the CPU is Intel® Celeron Dual Core 1200 MHz, then its rating is 1000". In the same way, at step 504, the RAM rating rule will be selected for the second PC 308 and the third PC 308. The RAM size of the second PC 308 is twice larger than the RAM size of the third PC 308. Thus, as it was described for the CPU, the RAM performance rating will be determined according to the relevant rules. The RAM rules may determine the performance rating for RAM size of 4096 in the second PC 308 as 4000, and for the RAM size of 2048 in the third PC 308 as 2000. Then, at step 505, the video card rule will be selected for the second and third PCs 308. The video card of the second PC 308 is of higher power than the one of the third PC 308 and has larger video memory capacity. The video card rules can determine the performance rating of Asus® ENGTX285/2D1/1GD3 video card with video RAM capacity of 1024 MB of the second PC 308 as 1000, and nVidia® GeForce® G 210M video card with video RAM capacity of 512 MB in the third PC 308—as 500. In addition, at step 506, the rules for the time of continuous operation will be selected for the second and third PCs 308 at this stage. The continuous operation policies can determine the performance rating of the second PC 308 as 3000 since it runs continuously for 30 hours; and the performance rating of the third PC 308 will be determined as 2000 since it runs continuously for 20 hours. The number of acts of determination of those or other rules described at a given stage is only a sample case; the number of the variables and their relevant rules can be any. At step 507, upon receiving the data of all performance ratings that are based on rules of the rating database 305, the rating module 304 summarizes the performance ratings of the second and the third PCs 308. Thus, the total performance rating of the second PC 308 is 10100 and the total performance rating of the third PC 308 is 5500. Finally, at step 508, the rating module 304 compares the total performance ratings and selects the PC 308 with the highest total performance rating. The second PC 308 has a higher total performance rating than the third PC 308; therefore, the rating module 304 will select the second PC 308 as a local administration proxy for the network 302 and mark its network address in the control module 303 as an administration proxy address. Furthermore, in order to perform remote administration tasks and to transmit data from administration server 301 to any PC 308, the control module 303 will establish connection to the second PC 308, which is administration proxy. The above examples do not limit the capabilities of the system described here. The information about the total performance rating of all PCs 308 in the network 302 and of each PCs serial number 308, according to the total performance rating, is stored in the rating database 305. The rating database 305 is updated regularly and contains the current information. The information about all PCs 308 will be arranged in ascending order of the total performance ratings. The rating module 304 transmits via control module 303 to the administration agents 310 of each PC 308 the information about the total performance rating of each PC 308 in the network 302 and its serial number according to the total performance rating.

Figure 6:
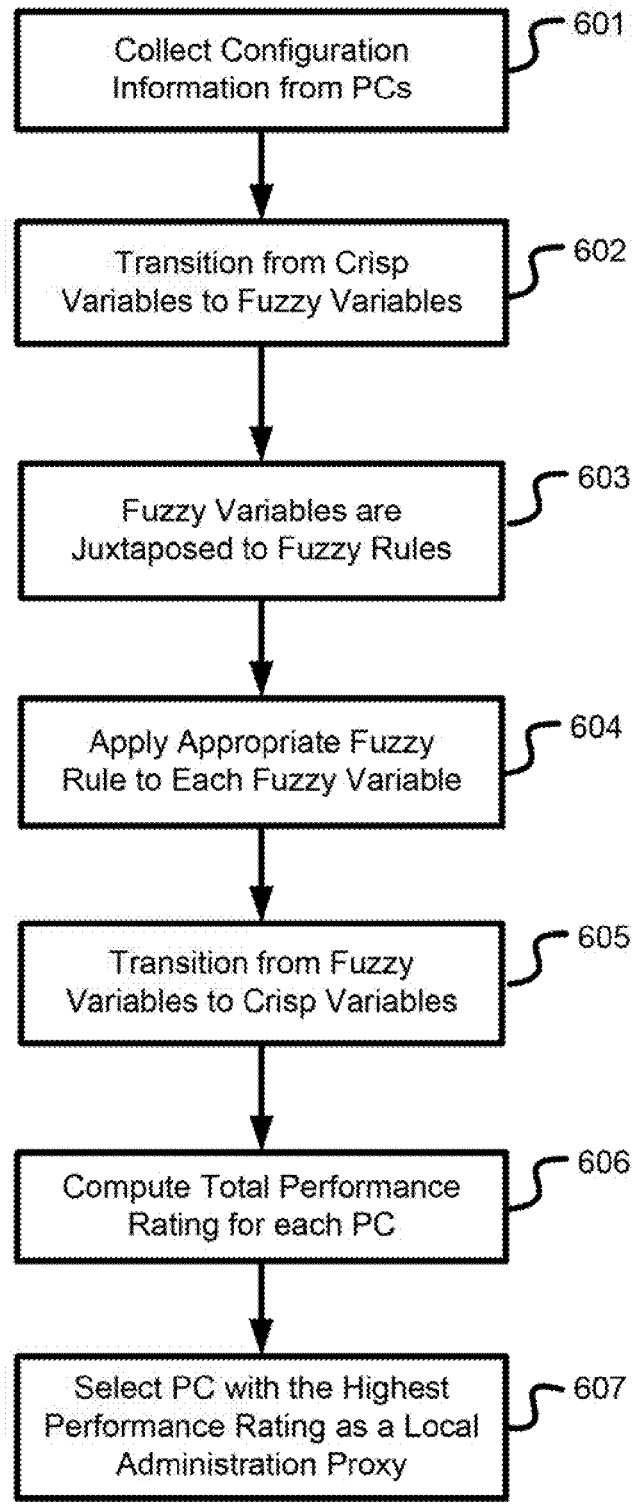
FIG. 6 illustrates an algorithm for evaluation of each PC's total performance rating based on fuzzy logic to select the most relevant PC to be set as an administration proxy in accordance with one example embodiment.

FIG. 6 illustrates a model realization of the algorithm for determining the total performance rating of each PC 308 in the network 302, based on fuzzy logic, in order to determine the most suitable PC 308 to be assigned as the local administration proxy. At step 601, the control module 303 of administration server 301 knowing all network addresses establishes a TCP connection to the administration agents 310 of all PCs 308 in the network 302. This takes place after the inventory service 309 from the number of installed services 306 will set an inventory task and the control module 303 will receive the information about the task that has been set and will send a UDP control signal to the administration agents 310 of all PCs 308 in the network 302 to perform inventory. In the case, when the network 302 is different from the network administration server 301, the administration agents 310 of all PCs 308 may establish TCP connections to the control module 303 of administration server 301 upon receiving UDP control signals. The administration agents 310 of all PCs 308 collect configuration information upon receiving a control signal and establishing a connection to the control module 303 of administration server 301. When the configuration information is collected, the administration agents 310 of each PC 308 in the network 302 send them to the control module 303. In its turn, the control module 303 transmits collected configuration information to the rating module 304. The configuration information is associated with each PC 308 in the network 302 by means of an identifier, for example, a network address, that allows distinguishing configuration information of different PCs 308. The collected configuration information represents the information of numerous variables, such as RAM size, for example. Most of collected variables contain crisp information such as RAM size 4096 MB. Next, at step 602, the transition from crisp values of the input variables to the fuzzy ones takes place. This process is called fuzzification. At step 603, the fuzzy rules from the rating database 305 are juxtaposed to fuzzy variables. As a result of the fuzzification, at step 604, the vile matching one or another fuzzy variable will be found. The given rule will describe a task to be solved; in the given model this will be a task to determine the performance rating of one or another PC 308 as a fuzzy variable. To come back to the crisp variables, there is a defuzzification step 605. To perform fuzzification and defuzzification processes, the rating database 305 contains all significant linguistic variables with a number of set definitions and exact physical values. Furthermore, at step 606, the performance ratings for every variable and the total performance rating are determined for each PC 308. Finally, at step 607, the PC 308 with the highest total performance rating is selected as the local administration proxy for network 302.

Following is an illustration of the algorithm in FIG. 6 using RAM size as a variable. At step 601, an administration agent 310 on PC 308 collects and transmit to the administration server 301 that RAM size of the PC 308 is 4096 MB. This configuration information is forwarded via control module 303 to the rating module 304. The rating database 305 has a number of linguistic variables and their definitions. There is a linguistic variable "RAM size"; it has three definitions, such as "Low", "Medium" and "High". There are also ranges of set values that correspond to one or another definition of the linguistic variable "RAM size". They are located in the rating database 305 as well. For example, here "Low" means a RAM size range from 0 to 2 GB, "Medium" corresponds to RAM size range from 2 to 5 GB and "High" corresponds to RAM size range of 5 GB and higher. Thereafter, at step 602, transition is made from the crisp value of the variable "RAM size" of 4096 MB to the fuzzy value of "Medium". This stage is called fuzzification. Thereafter, at the stage 603 the RAM definition juxtaposes the rules of the rating database 305. Here, such a rule can be the following: "If the RAM size is Medium, then the RAM performance rating is Medium". At step 604, all similar policies determining the performance ratings for every variable of the configuration information are set. Thus, at output, we get fuzzy values; and now transition can be made back to the crisp values of "RAM performance rating". At step 605, the inverse process of transition to crisp physical values of variables, called defuzzification, takes place. At this step, the range of values from the rating database 305 that correspond to the definitions of the resulted linguistic variable is set. For instance, the "Medium" definition of linguistic variable "RAM performance rating" corresponds to a value in the range of 2000 to 4000. Thereafter, at step 606, based on these values of certain ranges, the value that contributes to determining the total performance rating for each PC 308 will be selected. Here, for instance, the value for the "RAM performance rating" variable will be 3000. Similar actions will be performed for all variables of collected configuration information. Then the rating module 304 summarizes all performance ratings for each variable; and each PC 308 gets its total performance rating. Then, at step 607, the total ratings of each PC 308 are compared and the PC 308 with the highest total performance rating is selected as a local administration proxy for the network 302. Its network address is recorded in the control module 303. The information of the total performance ratings of all PCs 308 in the network 302 and of the serial numbers of each PC 308, according to their total performance ratings, is also stored in the rating database 305. The information about all PCs 308 is arranged in ascending order of the total performance rating values. In one example embodiment, the rating module 304 may transmit, via control module 303, to the administration agents 310 of each PC 308 the information of the total performance rating values of each PC 308 in the network 302 and its serial number according to the total performance rating.

There are also variables that need not be converted from a crisp type to a fuzzy one. For instance, such a variable can be the name of software installed in any PC 308 that is highly resource-intensive. Such software can be a graphic processor, for example Adobe® Photoshop®. This software uses for its operation a RAM of larger size than most of the applications installed on any other 308. Therefore, the performance rating of PC 308 should be calculated by taking into account that variable. For example, the rule from rating database 305 for Adobe® Photoshop® installed on any of PCs 308 may be the following: "If Adobe® Photoshop® is installed, then the RAM performance rating decrease is Minor". Thereafter, the "Minor" definition of the linguistic variable "RAM performance rating decreases" will correspond to the value in the range between 200 and 400. The value that contributes to determining the RAM performance rating will be selected from these values of certain ranges. Here, for example, the value of 300 is selected. Thus, for the PC 308 with RAM of 4096 MB and Adobe® Photoshop® installed, the RAM performance-rating value is 2700.

Figure 3B:
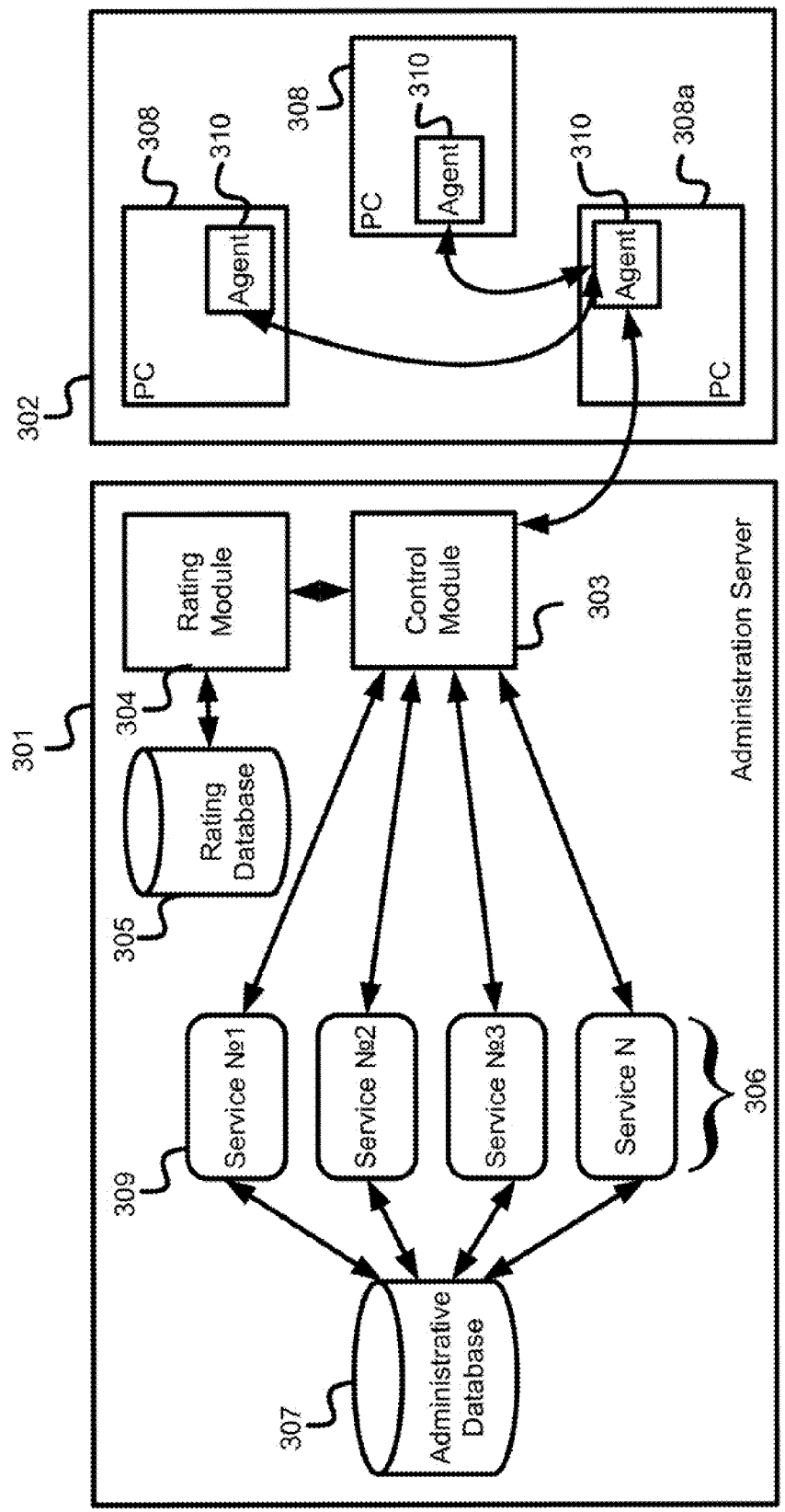
FIG. 3B illustrates the detailed interaction between the administration server and all networked PCs in a DMZ network in accordance with one example embodiment.

FIG. 3B illustrates the detailed interaction between administration server 301 and all of the PCs 308 in the network 302 in accordance with another example embodiment. Here the network 302 is a DMZ network. Administration proxy assignment takes place here in the following manner. At the installation of administration agents 310 in every PC 308, the administration agent 310 of the PC 308a is informed that it is used for communication between the control module 303 and the administration agents 310 of other PCs 308. Thus, at the initial stage, one of the PCs 308a in the network 302 becomes a temporary local administration proxy for the other PCs 308 in the network 302. The control module 303 knowing the network address of the temporary administration proxy in the network 302 establishes a TCP connection to administration agent 310 installed on that temporary administration proxy that is the PC 308a. The administration server 301 in the installed services 306 has an inventory service 309 (i.e. to collect firmware configuration data) of any PC 308. Such service is required for the interaction with administration agent 310 of any PC 308 in order to launch inventory tasks. At the initial stage, by means of the service 309, the inventory task for all PCs 308 in the network 302 is set from the number of installed services 306. Upon receiving the information from the service 309 from the number of installed services 306 that the tasks are set, the control module 303 sends a UDP control signal to administration agent 310 of the temporary administration proxy (the PC 308a in the network 302) to perform inventory. The administration agent 310 of the temporary administration proxy (the PC 308a) retransmits the UDP control signal to perform inventory to the administration agents 310 of the other PCs 308 in the network 302 for remote data collection of the PC 308. Upon receiving the UDP control signal from the control module 303 retransmitted by the administration agent 310 of the temporary administration proxy (the PC 308a), the administration agents 310 of each PC 308 establish a TCP connection to the administration agent 310 of the temporary administration proxy. Then, the administration agents 310 of each PC 308 in the network 302 collect configuration information of the PCs 308 on which they are deployed. Thereafter, the administration agent 310 of the temporary administration proxy (the PC 308a), besides retransmission of queries, collects data of the temporary administration proxy. When the configuration information is collected by the administration agents 310 of each PC 308 in the network 302, it is sent by the administration agents 310 of each PC 308 in the network 302 to the administration agent 310 of the temporary administration proxy (the PC 308a) and then to the control module 303. Next, based on the collected configuration information for each PC 308, the most suitable PC 308 is selected as a local administration proxy. For example, the total performance rating is evaluated for each PC 308 in the network 302, and the PC 308 with the highest total performance rating is selected as the local administration proxy for the network 302 using, for example, the processes described hereinabove.

Thus, a local administration proxy is selected after evaluation of the total performance ratings of all PCs 308 in the network 302. To provide correct network interaction between all PCs 308 in the network 302, the administration proxy and the administration server 301, it is necessary that all PCs 308 know that they should communicate to the administration server 301 via the administration proxy. If the network 302 is a DMZ network and it may be impossible to send queries from the DMZ network to the outer network segment, the control module 303 of administration server 301 establishes a TCP connection to the administration agent 310 of the temporary administration proxy (the PC 308a). Then the control module 303 sends a UDP control signal to the administration agent 310 of the temporary administration proxy (the PC

308*a*) which retransmits it to the administration agents of each PC 308 in the network 302. In response to the UDP control signal, the administration agents 310 of each PC 308 establish a TCP connection to the administration agent 310 of the temporary administration proxy (the PC 308*a*). A control module 303 transmits, via the administration agent 310 of the temporary administration proxy, to every administration agent 310 of each PC 308 in the DMZ network 302 the network address data of the PC 308 that was selected as the local administration proxy. In addition, the control module 303 sends, via the administration agent 310 of the temporary administration proxy, the total performance rating value of the given PC 308 as well as its serial number, according to its total performance rating, to the administration agent 310 of each PC 308. The control module 303 receives these values from the rating module 304. The information has an identifier, for example a network address, that allows to transmit to the administration agent 310 of each PC 308 in the network 302 its serial number according to its total performance rating as well as the value of the total performance rating. Thus, the administration agent 310 of each PC 308 in the network 302 is informed about its serial number according to the total performance rating and the value of the total performance rating. The control module 303 sends, via the administration agent 310 of the temporary administration proxy (the PC 308*a*), the information about the new status of the PC 308 as an administration proxy to the administration agent 310 of that PC 308 in the network 302 that was assigned as an administration proxy. The further interaction between the administration server 301 and, in particular, between its control module 303 and any PC 308 with installed administration agent 310 in the DMZ network 302, will be realized via the selected administration proxy.

In the case when the network 302 is different from the network of the administration server 301, another approach can be applied. In that case, the administration agents 310 of all PCs 308 in the network 302 that have Internet access are able to establish a TCP connection to the control module 303 of the administration server 301 upon receiving a UDP control signal. Upon establishing a connection to the control module 303 of the administration server 301, the administration agent 310 of each PC 308 receives from control module 303 the network address data of the PC 308, which will be selected as a local administration proxy for network 302. The control module 303 transmits the new status information of the given PC 308 and, in particular, its administration proxy information to the administration agent 310 of the PC 308 in the network 302 that was selected as an administration proxy that has established a connection to the administration server 301. The PCs 308 in the network 302, which do not have Internet access, start searching for the local administration proxy. For this purpose, a broadcasting channel can be used as a method of data transmission in computer networks where all members of the network accept a dataflow. The administration agent 310 of the PC 308 assigned as an administration proxy taps that query and responds to the administration agent 310 of that PC 308 that had sent the query about its status as an administration proxy.

In one example embodiment, the administration agents 310 of each PC 308 in the network 302 are able to collect information of the Windows® OS performance index and by using this information the PC 308 that optimally fits the role of administration proxy can be selected as the local administration proxy. Such approach can speed up the administration proxy selection since it requires less information for analysis. The Windows® performance index measures the firmware capabilities of a computer and represents the result in the form of number that is called base performance index. The high value of the base performance index means that the PC 308 operates better and faster, especially when performing complex and resource-intense tasks, than the PC 308 with a lower value of the base performance index. The index is compounded on the base of five main components, such as CPU, RAM, graphics, game graphics and main hard drive; each component is evaluated separately. The administration agents 310 of each PC 308 in the network 302, upon receiving a UDP control signal, may initiate the application for overall evaluation of the Windows® performance and then they may collect Windows® performance values for all PCs 308 in the network 302. Furthermore, the information is sent in the same way to the rating module 304 that juxtaposes this information to the rules in the rating database 305. Then the total performance rating for each PC 308 will be evaluated. The other possible implementation is when the rating module 304 selects an administration proxy from a number of PCs 308 in the network 302 on the basis of the base performance index of Windows® instead on the rules from the rating database 305. The rating module 304 compares the base performance indexes collected from all PCs 308 in the network 302, selects the highest one and sends the information about the PC 308 with the highest index in the network 302 to the control module 303 to select that computer as the administration proxy. In addition, the rating module 304 transmits to the administration agents 310 of each PC 308 via the control module 303 the information of the Windows® base performance indexes of each PC 308 and their serial numbers according to the Windows® base performance index.

In other embodiments, the service of evaluation of the total performance rating of the PC 308 can be set from the installed services 306 on the end of administration server 301. In this case, if the network 302 is different from the network of the administration server 301, the service responsible for the tasks among the installed services 306 sets the performance evaluation task for each PC 308. The control module 303, upon receiving the information from the service about the tasks set, sends a UDP control signal to the administration agents 310 of all PCs 308 in the network 302 to do a performance evaluation. In addition, the administration agent 310 of any PC 308 and the control module 303 can establish a TCP connection between them. Upon establishing a connection, the service responsible for performing similar tasks transmits via the control module 303 the data that are necessary to the administration agents 310 of all PCs 308 in the network 302 for performance evaluation. Then the administration agents 310 installed on every PC 308 in the network 302 evaluate the performance of each PC 308 in the network 302 and prepare an overall performance rating. Then the overall performance ratings are transmitted to the administration agents 310 of each PC 308 in the network 302 and to the control module 303 and, finally, to the service for total performance rating evaluation among the number of installed services 306 that, in turn, forwards the information to the administrative database 307. In addition, these values are forwarded via the control module 303 to the rating module 304 where they will be compared and the PC 308 with the highest total performance rating will be selected as an administration proxy. Furthermore, its network address information is presented to the control module 303. The overall performance ratings data of all PCs 308 in the network 302 are stored in the rating database 305. The information about all PCs 308 is arranged in ascending order of their total performance ratings. The rating module 304 sends via the control module 303 in the network 302, to all PCs 308 their overall performance ratings and their serial numbers according to the overall performance ratings.

Figure 3C:
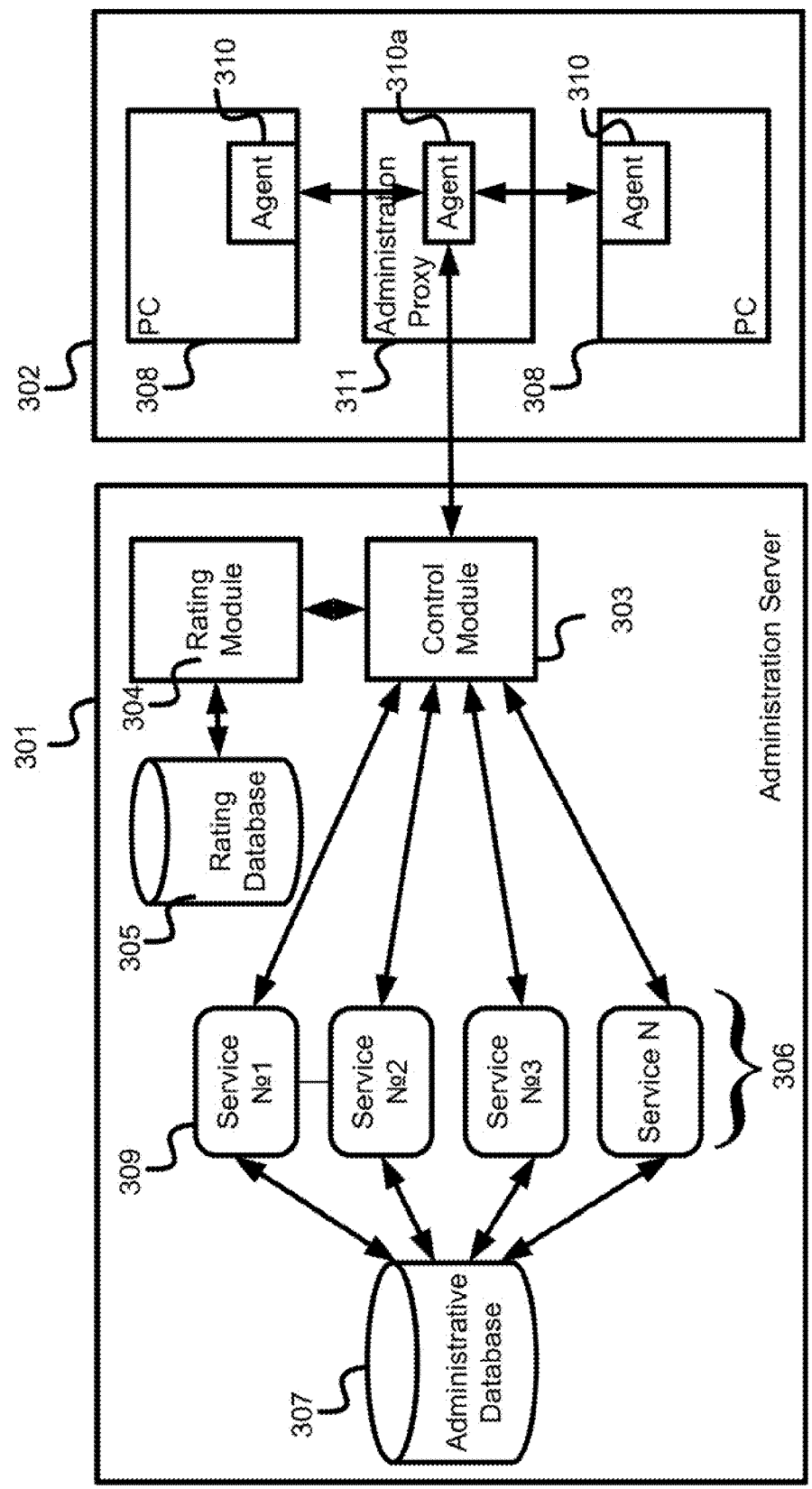
FIG. 3C illustrates the detailed interaction between the administration server and the administration proxy within the network in accordance with one example embodiment.

FIG. 3C illustrates the detailed interaction between the administration server 301, all PCs 308 and the administration proxy 311 (the same as 104 and 204) in the network 302 in accordance with another example embodiment. Upon assignment of an administration proxy 311 in the network 302, all information from the control module 303 of the administration server 301 is transmitted to the administration agent 310 of any PC 308 via the administration agent 310a (the same as 206a) of the administration proxy 311. In the inverse direction, the information is transmitted via the administration agent 310a of administration proxy 311. As stated above, the administration agents 310 of each PC 308 in the network 302 collect the configuration information on the basis of which the administration proxy 311 is selected; then the administration agent 310 of each particular PC 308 transmits the collected configuration information to the control module 303. In turn, the control module 303 transmits the received configuration information to the rating module 304 to select the PC 308 that is the most suitable to function as an administration proxy 311. The service 309 among the installed services 306 initiates the data collection by means of the administration agent 310. In the system operation, the control module 303 transmits data not only to the rating module 304, but also to the service 309 from the installed services 306 that sends collected configuration information to the administrative database 307. Then, the collected configuration information may be used by other services from among the installed services 306. In addition, the administration proxy 311 is used for retransmission (i.e. further transmission) of information. For example, the collected configuration information may be used to update the software installed on any PC 308 in the network 302. The service responsible for updates from among the installed services 306 may search in external resources for information about new software versions and compare the information obtained to the one from administrative database 307 about the software version installed on one or another PC 308 in the network 302. If the version of some software of any PC 308 in the network 302 is old, then the new software version is downloaded by means of the responsible service among the installed services 306 and is saved in the administrative database 307. Furthermore, by means of that service from among the installed services 306, the software update task will be set for one or another PC 308 in the network 302. Upon receiving the information from the responsible service from among the installed services 306 that the tasks are set, the control module 303 sends a UDP control signal to update certain software to the administration agent 310a of the administration proxy 311 with indication of the network address of that PC 308 to whose administration agent 310 the signal should be retransmitted. In addition, the administration agent 310a of the administration proxy 311 and the control module 303 establish a TCP connection between them. Upon receiving the control signal, the administration agent 310 of that PC 308 establishes a TCP connection to the administration agent 310a of the administration proxy 311. The administration agent 310a transmits via the control module 303 data of the connection between the PC 308 and the administration proxy 311 to the software updates service from among the services 306. Then the update service forwards the required update from the administrative database 307 via the control module 303 to the administration agent 310a of the administration proxy 311.

After that, the required update is forwarded to the administration agent 310 of that PC 308 in the network 302 that required a software update. The administration agent 310 of that PC 308 installs the required software. In addition, the updates service from among the installed services 306 updates the administrative database 307 information about the software version of the PC 308. Another similar application of the data collected and stored in the administrative database 307 can be used for troubleshooting. In that case, the troubleshooting service from among the installed services 306 compares the information of each PC 308 and of the administration proxy 311 from the administrative database 307 with the information of known vulnerabilities. The information of the known vulnerabilities may be stored in the administrative database 307 and be updated regularly. If any PC 308 in the network 302 has the vulnerable software installed and that vulnerability is known, then, the troubleshooting service from among the installed services 306 takes the actions that are necessary to remove the vulnerability. Patching of vulnerabilities can be such an action. The troubleshooting service from the installed services 306 may call for patch information to the external resources. Then, from the resources providing detailed information, the responsible service from among the installed services 306 downloads the required patches to the administrative database 307. Now the downloaded patches associate with the known vulnerabilities information that is also stored in the administrative database 307.

Then, by means of this service from the installed services 306, the patch installation task is set to remove the vulnerability in any PC 308 in the network 302. Upon receiving information about the assignment of the patch installation task from the troubleshooting service from among the installed services 306, the control module 303 sends a UDP control signal for patch installation indicating the PC 308 network address to the administration agent 310a of the administration proxy 311. In addition, the administration agent 310a of the administration proxy 311 and the control module 303 establish a TCP connection between them. Upon receiving the control signal, the administration agent 310 of that PC 308 establishes a TCP connection with the administration agent 310a of the administration proxy 311. Upon establishing a TCP connection between the administration agent 310a of the administration proxy 311 and the administration agent 310 of the PC 308 about the patch installation, the administration agent 310a of the administration proxy 311 transmits via the control module 303 the information for establishing a connection to the troubleshooting service among the installed services 306. Furthermore, the patch is forwarded by the troubleshooting service 306 via the control module 303 to the administration agent 310a of the administration proxy 311 and from there to the administration agent 310 of that PC 308 in the network 302 where the software containing some vulnerability is located. The administration agent 310 of the PC 308 installs the patch and removes the know vulnerability. In addition, the troubleshooting service from among the installed services 306 updates the information in administrative database 307 that the patch was installed for the software version installed on the given PC 308. Furthermore, in the process of vulnerability search, the troubleshooting service from among the installed services 306, while checking the information of known vulnerabilities against the installed software information of any PC 308, checks the administrative database 307 for patches. After the patch download from any external resource, that patch is associated with the information of known vulnerability stored in the administrative database 307.

If the administrative database 307 contains the information of some vulnerability but does not have a patch to remove it, then the troubleshooting service from among the installed services 306 will use external resources to search for patches.

Needless to note that the administration agent 310*a* of the administration proxy 311 in the network 302 is not always able to respond to control signals from the administration server 301 and to retransmit them to the administration agents 310 of other PCs 308. This can be due to any reasons, for example the administration proxy 311 may be turned off, restarted, disconnected from Internet, and so on. In this case, the system has the mechanism to select the other PC 308 in the network 302 as an administration proxy 311. In one example embodiment, to check the active state of the administration proxy 311, the control module 303 of the administration server 301 sends queries to the administration agent 310*a* of the administration proxy 311 with some intervals. If the response on the query from the control module 303 comes from the administration agent 310*a* of the administration proxy 311, this means that the administration proxy 311 is active. If there is no response, this means that the administration proxy 311 is inactive and a new administration proxy 311 needs to be selected.

As it was noted earlier, in the case of a DMZ network 302 all PCs 308 and the administration proxy 311 are not able to connect to other network segment different from the DMZ network. If no response from the administration agent 310*a* of the administration proxy 311 has been received to the query sent to the control module 303, then a new administration proxy 311 from other PCs 308 in the network 302 will be assigned. The control module 303 sends a query to the rating module 304 to select the PC 308 with second by value performance rating. Among the performance rating values for each PC 308 in the rating database 305, the rating module 304 selects the value corresponding to the second overall performance rating by value and transmits the information of that PC 308 to the control module 303. This information can be an identifier, such as the network address of that PC 308. Then the network address of that PC 308 appears in the control module 303. The control module 303 of the administration server 301 establishes a TCP connection to the administration agent 310 of the PC 308 that has the second overall performance rating by value and informs it about its new status as an administration proxy 311. Here, the administration agent 310 of the PC 308 is ready to establish a TCP connection to the control module 303. The administration agents 310 of the other PCs 308 in the DMZ network 302, while trying to connect to the administration agent 310*a* of the former administration proxy 311, find that the connection cannot be established. The administration agents 310 of the other PCs 308 start searching the PC 308 within the network 302 that can be selected as a new administration proxy 311. The broadcasting channel can be used for this purpose. The administration agent 310*a* of the new administration proxy 311 taps the query sent via the broadcasting channel and through this channel it informs all administration agents 310 of the other PCs 308 in the network 302 about its new status. Furthermore, all remote administration tasks and information are transmitted via the new administration proxy 311. When the administration agent 310 of the PC 308, which was an administration proxy 311 before, starts responding to queries from the administration server 301 retransmitted by means of the administration agent 310*a* of the administration proxy 311 that is second by performance value, then an administration proxy 311 function will be reassigned to it.

In the case, if the network 302 is different from the network of the administration server 301, except for the approach described above for the DMZ network, the other approach can be used. There every PC 308 with Internet access in the network 302 is able to connect to the administration server 301 and to its control module 303 in particular. Each PC 308 in the network 302 knows its serial number according to its performance rating value. If any administration agent 310 of any PC 308 cannot establish a connection with the administration agent 310*a* of the administration proxy 311, then it transmits this information to the other PCs 308 in the network 302, for example via the broadcasting channel. The administration agent 310 of PCs 308 of the PC with the second by value performance rating, upon receiving such information about the impossibility of a connection with the administration agent 310*a* of the administration proxy 311 connects to the control module 303 of the administration server 301. In this case, the administration agent 310 of the PC 308 with the second by value performance rating offers the administration server 301 to use this PC 308 as an administration proxy 311. The network address of that PC 308 appears in the control module 303. Furthermore, the administration agent 310*a* of the new administration proxy 311 informs all administration agents 310 of the other PCs 308 in the network 302 about its new status, for example via the broadcasting channel. All remote administration tasks and information are now transmitted via the new administration proxy 311. If the administration agent 310*a* of that administration proxy 311 stops responding to queries, then, in the way described above, the administration agent 310 of the PC 308 having the third by value performance rating in the network 302 becomes the new administration proxy. If the administration agent 310 of that PC 308 that formerly was an administration proxy 311 starts responding to control signals from the control module 303 of the administration server 301, retransmitted by means of the administration agent 310*a* of the administration proxy 311 with the second-by-value performance rating, then it takes back the status of administration proxy 311 for the network 302.

The network 302 can be extended by means of addition of new PCs 308. In this case, there can be a situation where the new PCs 308 added to the network 302 has higher firmware configuration than the existing administration proxy 311. For this purpose, the remote administration system has a mechanism for detection of such PCs 308 in the network 302. To search within the network 302 for new PCs 308 that do not have administration agent 310 installed, the control module 303 is set to transmit search queries within certain intervals to the administration agent 310*a* of the administration proxy 311 with further retransmitting via the broadcasting channel. Here, the ARP-spoofing can be used to detect new PCs 308 in the network 302 in accordance with one example embodiment. Upon detection of a new PC 308, the installation service from the installed services 306 sets a task to install an administration agent 310 on that PC 308 and informs the control module 303 about the task. In the case, where the network 302 is different from the network of administration server 301, the control module 303 establishes a direct connection to that PC 308 and installs an administration agent 310 there with indication of the network address of the PC 308 that is an administration proxy 311 in the network 302. After that, via the administration agent 310*a* of the administration proxy 311, the UDP control signal to perform inventory is forwarded to the administration agent 310 of that PC 308. Upon receiving a control signal, the administration agent 310 of the new PC 308 establishes a TCP connection to the administration agent 310*a* of the administration proxy 311, collects configuration information and sends the collected information to the control module 303 via the administration agent 310*a* of the administration proxy 311. Furthermore, the collected configuration information is forwarded to the rating module 304. Next, using one of the above-described methods, the overall performance rating of that PC 308 is evaluated and its serial number is determined according to its overall performance rating. The information about the overall performance rating of that PC 308, as well as of its serial number, is added to the rating database 305; thereby, the information of the serial numbers of all PCs 308 in the network 302 is updated. If the overall performance rating of that PC 308 is higher than that of the current administration proxy 311, then the new PC 308 is assigned as a new administration proxy 311 and the other PCs 308 in the network 302 are notified about the new administration proxy 311.

Figure 7:
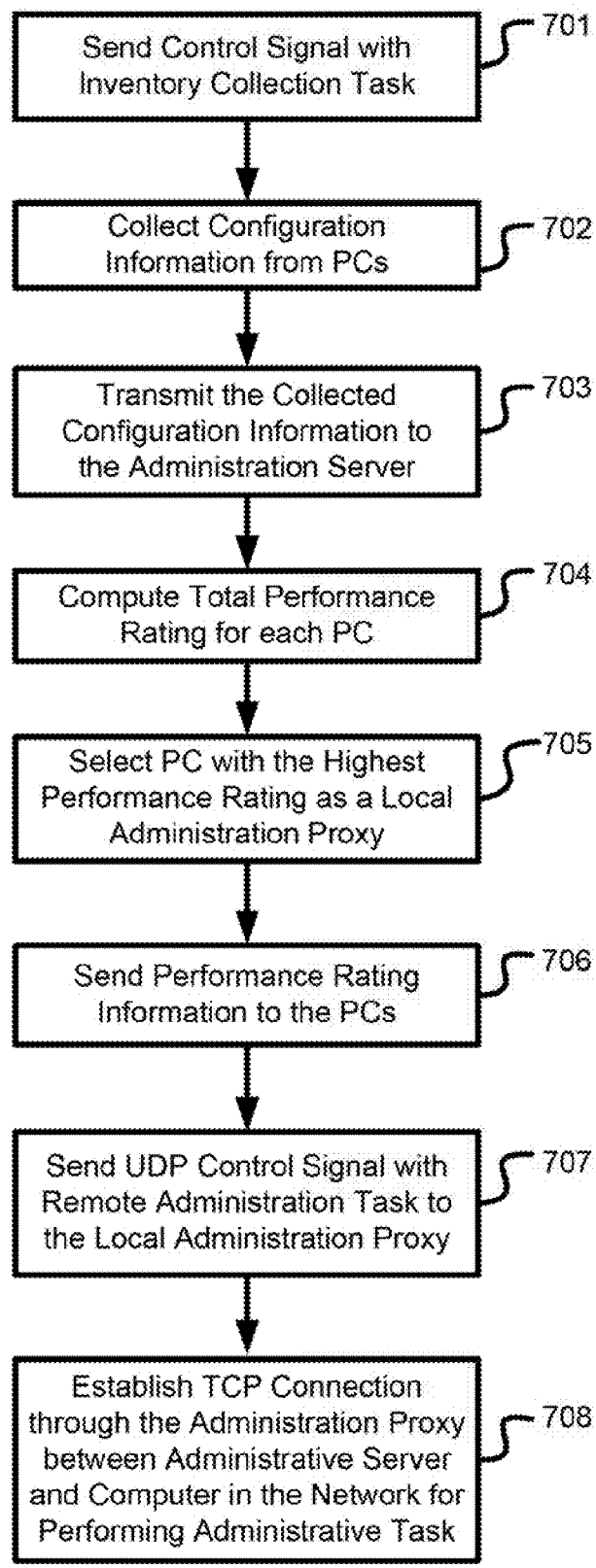
FIG. 7 illustrates an algorithm of the method of remote administration of networked computers in accordance with one example embodiment.

FIG. 7 illustrates the operation algorithm of the method for remote administration of networked computers in accordance with one example embodiment. At step 701, inventory service 309 from the installed services 306 generates inventory task for all PCs 308 in the network 302. In this case, when the network 302 is different from the network of the administration server 301, the control module 303, upon receiving the task-setting information from the service 309, sends a UDP control signal to the administration agents 310 of all PCs 308 in the network 302 to perform inventory. In this case, when the network 302 is different from the network of the administration server 301, the administration agents 310 of each PC 308, upon receiving a UDP control signal from the control module 303, establish a TCP connection to the control module 303 of the administration server 301. At step 702, the administration agents 310 of each PC 308 in the network 302 collect configuration information of the PCs 308 in which they are deployed. Once configuration data has been collected by the administration agents 310 of each PC 308 in the network 302, the administration agent 310 of each particular PC 308 transmits the collected data to the control module 303 at step 703. In its turn, the control module transmits the collected data to the rating module 304. In the case of DMZ network at the initial stage, any PC 308 in the network 302 becomes a temporary administration proxy for the other PCs 308 in the network 302. Knowing the network address of the temporary administration proxy in the network 302, the control module 303 establishes a TCP connection to the administration agent 310 installed on the temporary administration proxy. By means of the service 309 among the installed services 306, the new inventory task is set for all PCs 308 in the network 302. Upon receiving the task information from the service 309 from among the installed services 306, the control module 303 transmits a UDP control signal to the administration agent 310 of the temporary administration proxy in the network 302 to perform inventory. The administration agent 310 of the temporary administration proxy retransmits the UDP control signal for inventory to the administration agents 310 of the other PCs 308 in the network 302 for remote collection of PCs data 308. The administration agents 310 of each PC 308, upon receiving the UDP control signal from the control module 303, retransmitted by means of the administration agent 310 of the temporary administration proxy, establish a TCP connection to administration agent 310 of the temporary administration proxy. Then the administration agents 310 of each PC 308 in the network 302 collect configuration information of the PC 308 on which they are deployed. In addition, the administration agent 310 of the temporary administration proxy collects, besides the query retransmission, information about the temporary administration proxy for the network 302. Upon the collection of configuration information by the administration agents 310 of each PC 308 in the network 302, the administration agents 310 of each PC 308 in the network 302 transmit the data to the administration agent 310 of the temporary administration proxy and then to control module 303. At step 704, the rating module 304 computes the total performance rating for each PC 308. In particular, the rating module 304 compares the collected configuration data to the rating database information 305 and selects the relevant rules for each variable. The rating database 305 contains rules for performance rating evaluation of each PC 308 in the network 302. The rules for all variables may be based both on crisp or fuzzy logics. Upon receiving data of all ratings based on rules from the rating database 305, the rating module 304 summarizes the ratings for each PC 308, obtaining the overall performance rating of each PC 308. At the stage 705, the rating module 304 compares the performance ratings and selects the PC 308 with the highest overall performance rating to assign it as an administration proxy 311. In the case where the network 302 is different from the network of the administration server 301, the control module 303 transmits to the administration agent 310 of each PC 308 in the network 302 the network address information of the PC 308 that is assigned as an administration proxy 311. At step 706, the control module 303 sends to the administration agent 310 of each PC 308 the value of the overall performance rating and the serial number of that PC 308 based on its overall performance rating. The control module 303 gets those values from the rating module 304. This information has an identifier, such as the network address, that permits to inform the administration agent 310 of each PC 308 in the network 302 about its serial number based on its overall performance rating. Thus the administration agent 310 of each PC 308 in the network 302 knows its serial number based on its overall performance rating and the value of its overall performance rating. The control module 303 transmits to the administration agent 310a of that PC 308 in the network 302 that was assigned as an administration proxy 311 the information of the new status of that PC 308 as an administration proxy 311. Furthermore, the control module 303 will connect to the administration agent 310a of the administration proxy 311 to perform any remote administration tasks or to transmit information from the administration server 301 to any PC 308, or for the inverse communication. In the case of a DMZ network 302, then at the stage of assigning of any PC 308 with the highest overall performance rating as an administration proxy 311, all interactions between the control module 303 of the administration server 301 and the administration agents 310 of each PC 308 in the network 302 are realized via a temporary administration proxy. Next, at step 707, some service among the installed services 306 sets the remote administration task for any PC 308 in the network 302. The control module 303, upon receiving the task-setting information from the service among the installed services 306, transmits a UDP control signal to perform the task to the administration agent 310a of the administration proxy 311 indicating the network address of that PC 308 to whose administration agent 310 the signal should be retransmitted. In addition, the administration agent 310a of the administration proxy 311 and the control module 303 establish a TCP connection between them. At step 708, upon receiving the control signal, the administration agent 310 of any PC 308 establishes a TCP connection to the administration agent 310a of the administration proxy 311. The administration agent 310a transmits via the control module 303 the information of establishing connection between the PC 308 and the administration proxy 311 to the service that has set that administrative task.

If the task includes a transmission of additional data, such as patches for remote installation from the service among the installed services 306 to any PC 308, then such patches are sent by some service from the administrative database 307 via the control module 303 to the administration agent 310a of the administration proxy 311. Afterwards, the patch is forwarded to the administration agent 310 of that PC 308 in the network 302 that needs a patch installation. The administration agent 310 of that PC 308 installs the given patch and informs about task completion via the administration agent 310a of the administration proxy 311. If the task does not involve any additional data transmission from the service in the PC 308, then the administration agent 310 of any PC 308, upon establishing a TCP connection to the administration agent 310a of the administration proxy 311, forwards the information about the task completion.

In one example embodiment, there can be several local administration proxies 311 in the network 302. For example, a large-scale network 302 and can include a large number of PCs 308. In that case, a single administration proxy 311 with installed administration agent 310a cannot efficiently transmit and receive all control signals and information from the control module 303 of the administration server 301 to the administration agents 310 of the other PCs 308 in the network 302. Such tasks with bulk of information may drastically affect the performance and operation rate of the administration proxy 311 in the Internet.

Figure 8:
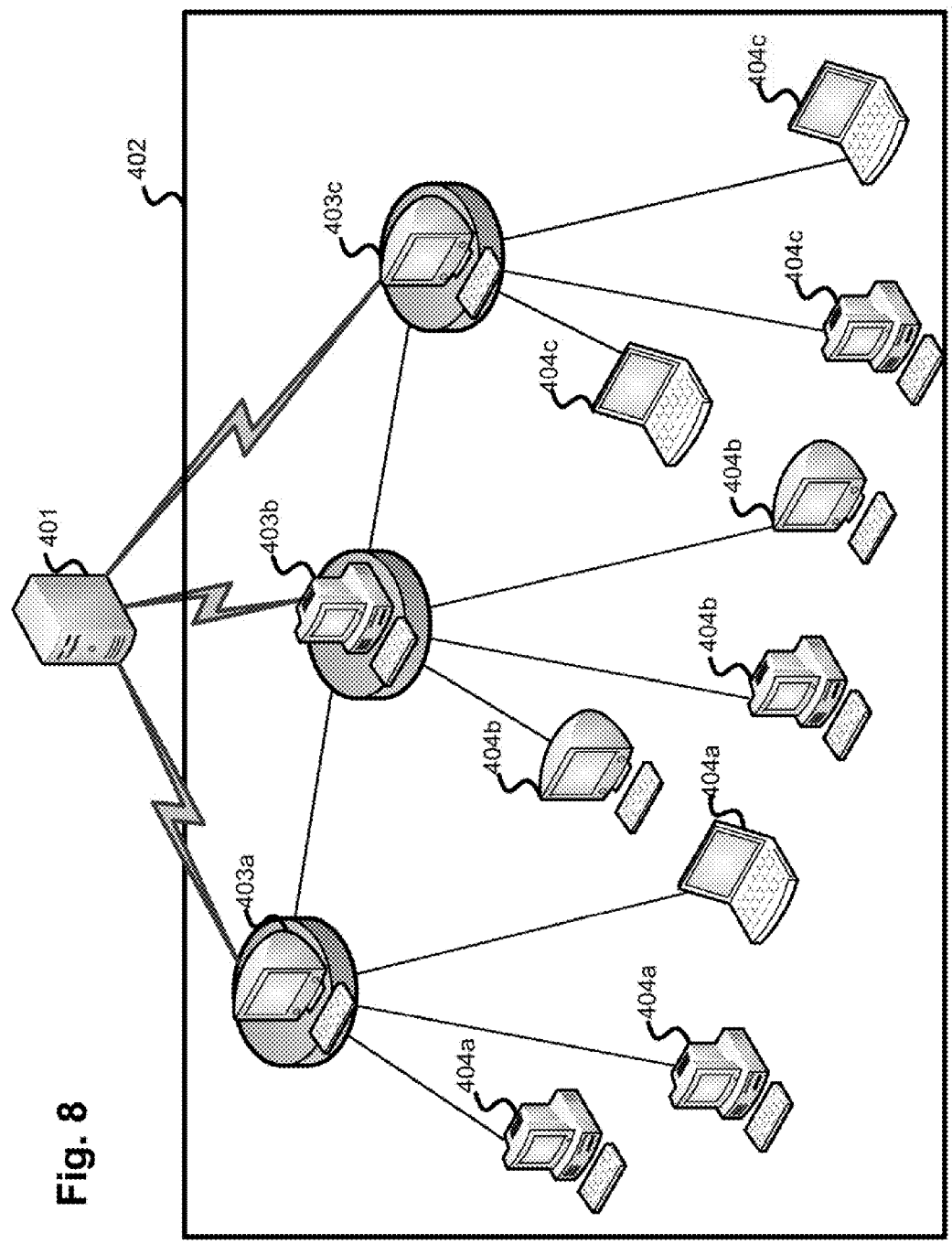
FIG. 8 illustrates the interaction between the administration server and multiple administration proxies in the extended network in accordance with one example embodiment.

FIG. 8 illustrates the interaction between the administration server 401 (the same as 102, 203 and 301) and a number of administration proxies 403a, 403b, 403c (the same as 104, 204 and 311) within the large-scale network 402 (the same as 101, 201 and 302). As shown, the network 402 is divided into three subnets A, B and C. The administration proxy 403a retransmits from the administration server all remote administration tasks and queries of all PCs 404a of the first subnet A. The same way the interaction is implemented in the second and third subnets B and C. In the simplest case, the administrator can divide the network 302 into subnets by the number of computers, by selecting the PC's 404a network addresses to belong to the first subnet, the PCs 404b—to the second subnet, and the PCs 404c—to the third subnet. From the numbers of PCs 404a, 404b, 404c (the same as 103, 205 and 308), the local administration proxy with the highest performance rating is selected for each corresponding subnet. Then the administration proxy 403a retransmits from the administration server 401 control signals and information of the remote administration tasks to the PCs 404a in the first subnet. The same process runs for the second and third subnets. For example, besides the interaction between the first segment PC 404a, the administration proxy 403a and the administration server 401, there is interaction between the PCs of first 404a and the second 404b subnets. For instance, the PC 404a of the first subnet has the "Shared documents" folder and the PCs 404b of the second subnet download documents from that folder. In this case, the interaction between the PC 404a and PC 404b takes place by means of the administration proxy 403a and the administration proxy 403b. The subnet selection can be based on network addresses and a subnet mask.

Figure 9:
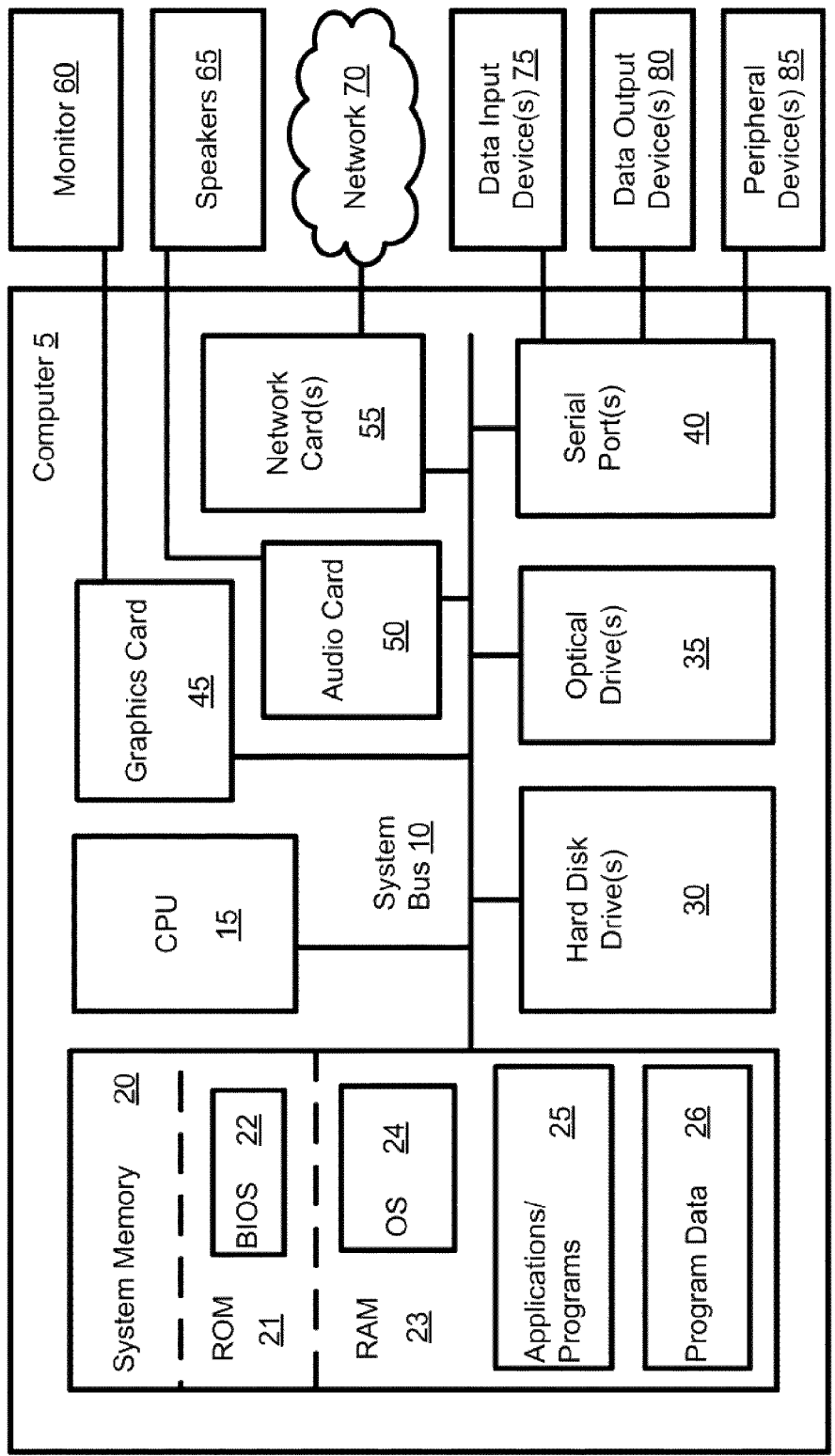
FIG. 9 illustrates a schematic diagram of a computer system in accordance with one example embodiment.

FIG. 9 depicts one example embodiment of a computer system 5, such as a network server, suitable for implementing the remote administration server 301 and PCs 308. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A system for administration of a computer network, the system comprising:
    a plurality of administration agents deployed on the computers in the network, wherein an administration agent being configured to:
        collect configuration information from a computer on which it is deployed;
        transmit the collected configuration information to a remote administration server for computing performance ratings of the computers based on the configuration information and selecting a local administration proxy for the network based on the performance rating; and
        perform on the computer one or more administrative tasks specified by the remote administration server through a connection with the remote administration server;
    the local administration proxy for the network, wherein the local administration proxy includes a computer with the highest performance rating in the computer network selected by the remote administration server based on the configuration information collected by the administration agents, wherein the local administration proxy being configured to:
        receive from the remote administration server a control signal addressed to a computer in the network for performing one or more administrative tasks on said computer; and
        in response to the control signal, establish the connection between the remote administration server and the administration agent deployed on said computer for the performing administrative tasks on said computer.

2. The system of claim 1, wherein in the event the local administration proxy fails to communicate with the remote administration server or with the computers in the network:
    the administration agents are configured to select a computer with the second highest performance rating as a new local administration proxy for the network; and
    the new local administration proxy is configured to notifying the remote administration server about selection of the new local administration proxy for the network.

3. The system of claim 2, wherein selecting a computer with the second highest performance rating comprises: the administration agents exchanging broadcast messages containing information representing performance ratings of the computers in the network.

4. The system of claim 1, wherein the local administration proxy includes an administration agent configured to:
    search for newly activated computers on the network;
    deploy an administration agent on a newly activated computer;
    collect configuration information from the administration agent; and
    transmit the collected configuration information to the remote administration server for computing a performance rating of the newly activated computer based on the collected configuration information and selecting the newly activated computer as a new local administration proxy for the network if the performance rating of the newly activated computer is higher than the performance rating of the local administration proxy.

5. The system of claim 4, wherein searching for newly activated computers is performed using one of message broadcasting or ARP-spoofing on the network.

6. The system of claim 4, wherein the administration agent of the local administration proxy is further configured to:
    receive the control signal from the remote administration server using User Datagram Protocol (UDP); and
    establish the connection between the remote administration server and the administration agent deployed on said computer using Transmission Control Protocol (TCP).

7. The system of claim 1, wherein the computer network comprises a plurality of subnets, wherein each subnet includes a local administration proxy for the subnet.

8. A method for administration of a computer network, the method comprising:
    deploying a plurality of administration agents on computers in the network;
    collecting by the administration agents configuration information from the computers;
    transmitting the collected configuration information to a remote administration server for computing performance ratings of the computers based on the collected configuration information and selecting a computer with the highest performance rating as a local administration proxy of the remote administration server for the computer network;
    receiving, by the selected local administration proxy for the computer network, from the remote administration server a control signal addressed to a computer in the network for performing one or more administrative tasks on said computer, wherein the local administration proxy is a computer with the highest performance rating among the computers in the network;
    in response to the control signal, establishing through the local administration proxy a connection between the remote administration server and the administration agent deployed on said computer for the performing administrative tasks on the computer; and
    performing on said computer, by the administration agent, one or more administrative tasks specified by the remote administration server through the established connection.

9. The method of claim 8, wherein in the event the local administration proxy fails to communicate with the remote administration server or with the computers in the network:
   selecting by the administration agents a computer with the second highest performance rating as a new local administration proxy for the network; and
   notifying the remote administration server about selection of the new local administration proxy for the network.

10. The method of claim 9, wherein selecting a computer with the second highest performance rating comprises: exchanging by the administration agents broadcast messages containing information representing performance ratings of the respective computers.

11. The method of claim 8, further comprises:
   searching by the administration agent of the local administration proxy newly activated computers on the network;
   deploying an administration agent on a newly activated computer;
   collecting by the administration agent configuration information from the computer; and
   transmitting the collected configuration information to the remote administration server for computing a performance rating of the newly activated computer based on the collected configuration information and selecting the newly activated computer as a new local administration proxy for the network if the performance rating of the newly activated computer is higher than the performance rating of the local administration proxy.

12. The method of claim 11, wherein searching for newly activated computers is performed using one of message broadcasting or ARP-spoofing on the network.

13. The method of claim 8, further comprises:
   receiving, by the administration agent of the local administration proxy, the control signal from the remote administration server using User Datagram Protocol (UDP); and
   establishing, by the administration agent of the local administration proxy, the connection between the remote administration server and the administration agent deployed on said computer using Transmission Control Protocol (TCP).

14. The method of claim 8, wherein the computer network comprises a plurality of subnets, wherein each subnet includes a local administration proxy for the subnet.

15. A computer program product embedded in a non-transitory computer-readable storage medium, the computer-readable storage medium comprising computer-executable instructions for administration of a computer network, the medium comprises instructions for:
   deploying a plurality of administration agents on computers in the network;
   collecting by the administration agents configuration information from the computers;
   transmitting the collected configuration information to a remote administration server for computing performance ratings of the computers based on the collected configuration information and selecting a computer with the highest performance rating as a local administration proxy of the remote administration server for the computer network;
   receiving, by the selected local administration proxy for the computer network, from the remote administration server a control signal addressed to a computer in the network for performing one or more administrative tasks on said computer, wherein the local administration proxy is a computer with the highest performance rating among the computers in the network;
   in response to the control signal, establishing through the local administration proxy a connection between the remote administration server and the administration agent deployed on said computer for the performing administrative tasks on the computer; and
   performing on said computer, by the administration agent, one or more administrative tasks specified by the remote administration server through the established connection.

16. The medium of claim 15, wherein in the event the local administration proxy fails to communicate with the remote administration server or with the computers in the network:
   selecting by the administration agents a computer with the second highest performance rating as a new local administration proxy for the network; and
   notifying the remote administration server about selection of the new local administration proxy for the network.

17. The medium of claim 16, wherein instructions for selecting a computer with the second highest performance rating comprises: instructions for exchanging by the administration agents broadcast messages containing information representing performance ratings of the respective computers.

18. The medium of claim 15, further comprises instructions for:
   searching by the administration agent of the local administration proxy newly activated computers on the network;
   deploying an administration agent on a newly activated computer;
   collecting by the administration agent configuration information from the computer; and
   transmitting the collected configuration information to the remote administration server for computing a performance rating of the newly activated computer based on the collected configuration information and selecting the newly activated computer as a new local administration proxy for the network if the performance rating of the newly activated computer is higher than the performance rating of the local administration proxy.

19. The medium of claim 18, wherein searching for newly activated computers is performed using one of message broadcasting or ARP-spoofing on the network.

20. The medium of claim 15, further comprises instructions for:
   receiving, by the administration agent of the local administration proxy, the control signal from the remote administration server using User Datagram Protocol (UDP); and
   establishing, by the administration agent of the local administration proxy, the connection between the remote administration server and the administration agent deployed on said computer using Transmission Control Protocol (TCP).

\* \* \* \* \*